(12) United States Patent
Shangin et al.

(10) Patent No.: US 11,775,908 B2
(45) Date of Patent: Oct. 3, 2023

(54) NEURAL NETWORK-BASED SYSTEMS AND COMPUTER-IMPLEMENTED METHODS FOR IDENTIFYING AND/OR EVALUATING ONE OR MORE FOOD ITEMS PRESENT IN A VISUAL INPUT

(71) Applicant: FLORENT TECHNOLOGIES LLC, Vail, CO (US)

(72) Inventors: Leonid Aleksandrovich Shangin, Arkhangelsk (RU); Ilya Evgenievich Ivanov, Moscow Region (RU); William Christopher Wynne, Vail, CO (US)

(73) Assignee: FLORENT TECHNOLOGIES LLC, Vail, CO (US)

( * ) Notice: Subject to any disclaimer, the term of this patent is extended or adjusted under 35 U.S.C. 154(b) by 72 days.

(21) Appl. No.: 17/179,771

(22) Filed: Feb. 19, 2021

(65) Prior Publication Data
US 2021/0279855 A1 Sep. 9, 2021

Related U.S. Application Data

(63) Continuation of application No. PCT/US2019/047171, filed on Aug. 20, 2019.

(51) Int. Cl.
*G06Q 10/0639* (2023.01)
*G06T 7/00* (2017.01)
(Continued)

(52) U.S. Cl.
CPC ....... *G06Q 10/0639* (2013.01); *G06F 18/213* (2023.01); *G06F 18/241* (2023.01);
(Continued)

(58) Field of Classification Search
CPC ......... G06T 7/0004; G06T 2207/20016; G06T 2207/30128; G06K 9/6232; G06K 9/6268;
(Continued)

(56) References Cited

U.S. PATENT DOCUMENTS 9,257,150 B2  2/2016  Hurst et al.
9,336,830 B1  5/2016  Hurst et al.
(Continued)

OTHER PUBLICATIONS

Less Is More—Picking Informative Frames, Chen et al, 2018; https://arxiv.org/pdf/1803.01457.pdf (Year: 2018).*
(Continued)

*Primary Examiner* — Jianxun Yang
(74) *Attorney, Agent, or Firm* — Greenberg Traurig, LLP

(57) ABSTRACT

In some embodiments, the present invention provides for an exemplary inventive convolutional neural network-based and computer-implemented method for identifying and evaluating pizza, including: collecting video input representative of the food and received from at least one camera, applying a first CNN to select, from the video input, a set of best pizza containing video frames of a particular pizza from the plurality of pizza containing video frames; applying the first CNN to identify a best pizza containing image from the set, to localize at least one pizza portion of the particular pizza in the identified best pizza containing image, and to determine a type of the pizza of the particular pizza from the identified best pizza containing image; applying a second CNN to determine a map of pizza components of the particular pizza by automatically performing pizza image segmentation and to automatically score the particular pizza based on the determined map of pizza components.

12 Claims, 15 Drawing Sheets

(51) Int. Cl.
*G06V 20/40* (2022.01)
*G06F 18/213* (2023.01)
*G06F 18/241* (2023.01)

(52) U.S. Cl.
CPC ............ *G06T 7/0004* (2013.01); *G06V 20/40* (2022.01); *G06T 2207/20016* (2013.01); *G06T 2207/30128* (2013.01)

(58) Field of Classification Search
CPC ........ G06V 10/22; G06V 10/30; G06V 10/40; G06V 20/40; G06N 20/10; G06N 3/0454; G06N 3/08; G06Q 10/06; G06Q 50/12; G06Q 10/0639
See application file for complete search history.

(56) References Cited

U.S. PATENT DOCUMENTS

| | | | |
|---|---|---|---|
| 9,798,987 | B2 | 10/2017 | Chapman et al. |
| 9,914,223 | B2 | 3/2018 | Fritz-Jung et al. |
| 2018/0284091 | A1* | 10/2018 | Levanon ................ G01K 13/10 |
| 2019/0223725 | A1* | 7/2019 | Lu ........................ A61B 5/7267 |
| 2019/0311070 | A1* | 10/2019 | Huang ..................... G06N 5/02 |
| 2020/0184265 | A1* | 6/2020 | Nomura .................... G06T 7/90 |

OTHER PUBLICATIONS

Scheduled Sampling, Bengio, 2015; https://arxiv.org/pdf/1506.03099.pdf (Year: 2015).*
International Search Report and Written Opinion, dated Jun. 2, 2020, from related International Patent App. No. PCT/US2019/047171.
Chen, Y., et al., "Less is more: picking informative frames for video captioning", pp. 1-14, arxiv.org, Cornell University Library, 201 Olin Library Cornell University, Ithaca, NY, 14853, Mar. 5, 2018.
Du, C-J, et al., "Recent developments in the applications of image processing techniques for food quality evaluation", *Trends in Food Science & Technology*, vol. 15, No. 5, May 1, 2004, pp. 230-249.
Du, C-J, et al., "Learning techniques used in computer vision for food quality evaluation: a review", *Journal of Food Engineering*, vol. 72, No. 1, Jan. 1, 2006, pp. 39-55.
Da-Wen Sun, et al., "Pizza quality evaluation using computer vision—Part 1, Pizza base and sauce spread", *Journal of Food Engineering*, vol. 57(1), Mar. 2003, 81-89.
Da-Wen Sun, et al., "Pizza quality evaluation using computer vision—Part 2, Pizza topping analysis", *Journal of Food Engineering*, vol. 57(1), Mar. 2003, 91-95.
Mashi, M., et al., "A knowledge-based system for measuring the quality of the distribution of salami slices on pizza crusts", 2011 IEEE Jordan Conference on Applied Electrical Engineering and Computing Technologies (AEECT), Dec. 6, 2011, pp. 1-8.
Misimi, E., et al., "Robust classification approach for segmentation of blood defects in cod fillets based on deep convolutional neural networks and support vector machines and calculation of gripper ventors for robotic processing", *Computers and Electronics in Agriculture* 139, May 24, 2017, pp. 138-152.
Picard, N. "Smooth Segmentation in Videos: Blind Consistency Over Segmentations Produced by Fully Convolutional Networks", thesis by Noah Picard, submitted to Dept. of Computer Science, Brown University, Providence, Rhode Island, Apr. 2018, pp. 1-19, retrieved from the Internet on Jun. 17, 2019, at https://cs.brown.edu/research/pubs/theses/ugrad/2018/picard.noah.pdf.
Qi, Xuan, et al., "CNN Based Key Frame Extraction for Face in Video Recognition", 2018 IEEE 4$^{th}$ International Conference on Identity, Security and Behavior Analysis, IEEE, Jan. 11, 2018, pp. 1-8.
Wu, Q., et al, "The application of deep learning in computer vision", 2017 Chinese Automation Congress (CAC), IEEE, Oct. 20, 2017, pp. 6522-6527.
"Convolutional neural network" downloaded from Wikipedia, retrieved from the Internet on Nov. 26, 2018 at https://wikpedia.org/w/index.php?title=Convolutional_neural_network&oldid=802888745#Pooling_layer.

* cited by examiner

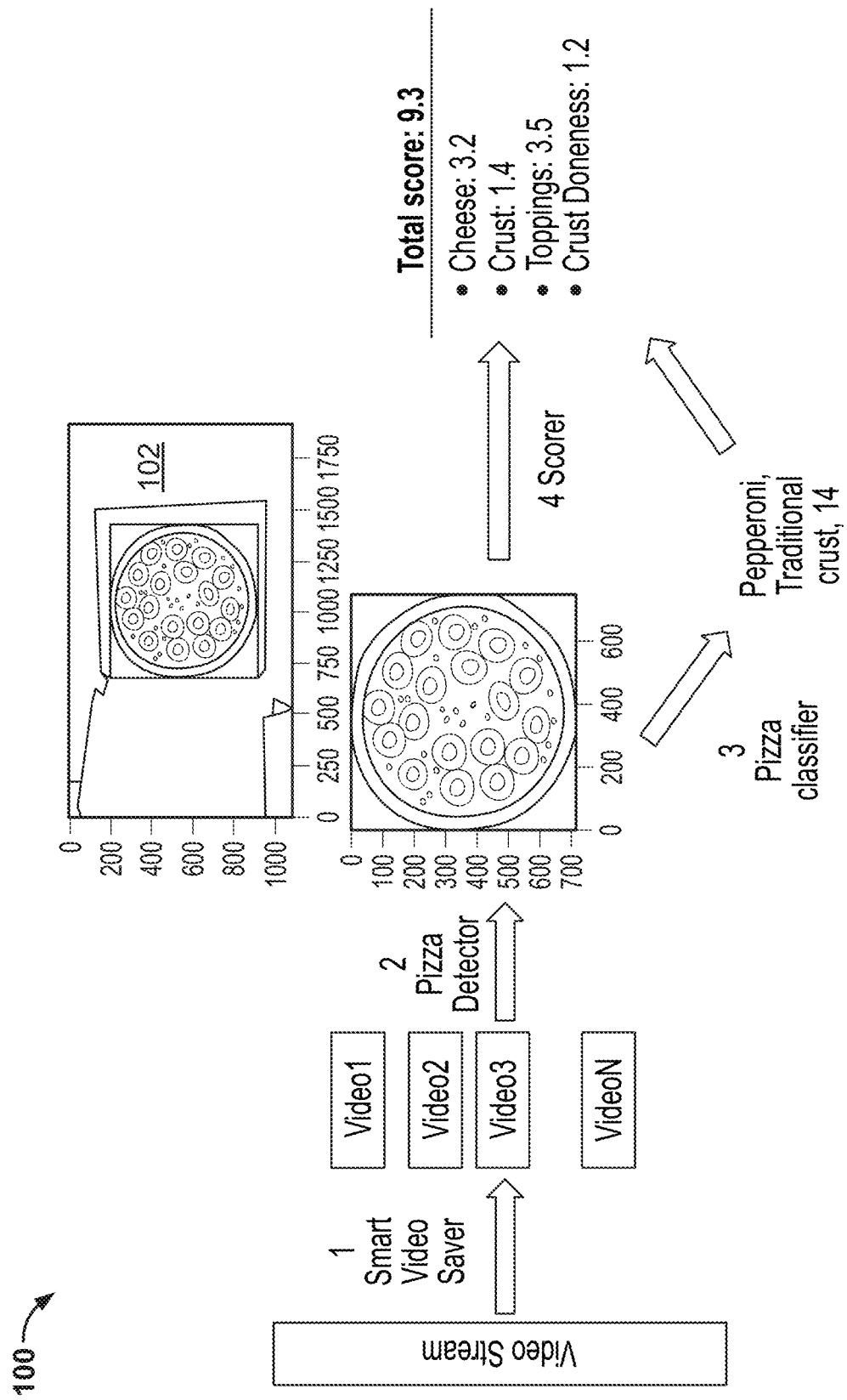

Crust is unacceptably extending over the box's edge
Crust is turned inside
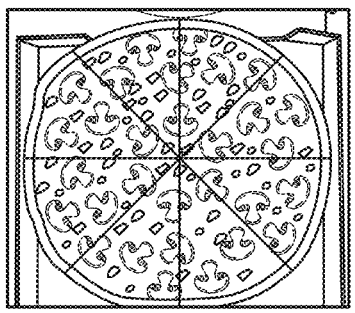
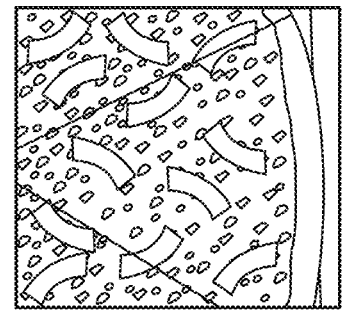
Crust is flat and/or uneven shape (e.g., oval or other non-circular)
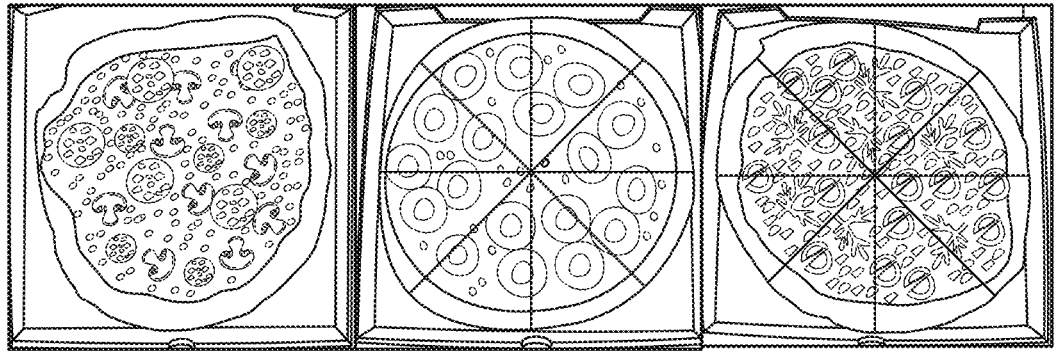
Fig. 4A
Acceptable
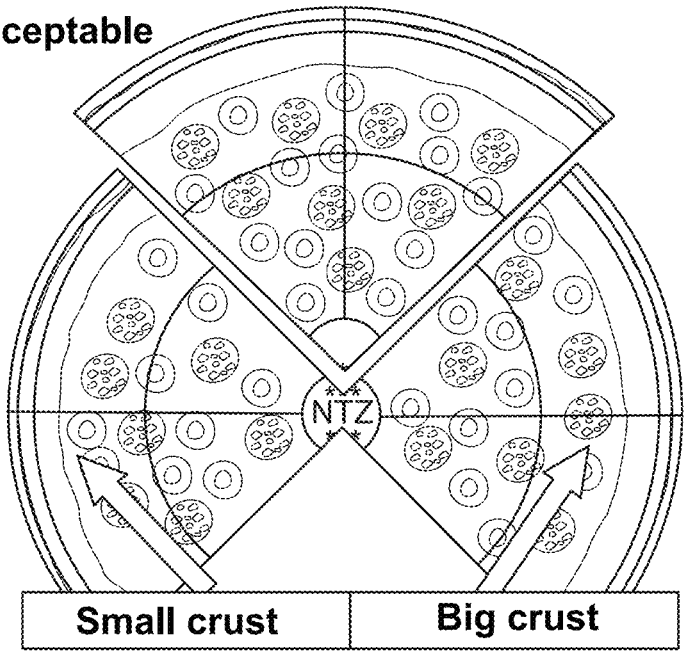
| Small crust | Big crust |
Fig. 4B

| | |
|---|---|
| 1-4=0, 5-6=0.30, 7-11=0.60, 12-13=0.30, 14-16=0 | 1,20<br>0,60 |
| 1-4=0, 5-6=0.30, 7-11=0.60, 12-13=0.30, 14-16=0 | 0,60 |

| | Crust | | Cheese | | | Toppings | | Total |
|---|---|---|---|---|---|---|---|---|
| | .10 pts deducted for each slice that was more than 25% outside of the red line | .10 pts deducted for each slice that had more than 50% cheese and/or toppings on the crust | .10 pts deducted for each outer box that does not have 75% cheese lock | .10 pts deducted for each slice that has uncooked cheese cubes or burnt cheese | .10 pts deducted for every outer and inner box missing the correct cheese distribution portions | 25 pts deducted for every outer box missing the correct portions | 25 pts deducted for every inner box missing the correct portions | |
| | | | | | Outer / Inner | | | |
| Slice 1 | | | X | | X (Inner) | | X | |
| Slice 2 | | | X | | X (Outer), X (Inner) | X | X | |
| Slice 3 | X | | | | | X | | |
| Slice 4 | X | | | | | X | | |
| Slice 5 | | | | | | | | |
| Slice 6 | | | X | | X (Outer) | | | |
| Slice 7 | | | X | | | X | X | |
| Slice 8 | | | | | | | | |
| | 0.6 | 0.8 | 0.4 | 0.8 | 0.6 / 0.5 | 0.75 | 1.0 | 5.45 |

Total Cheese Points 2.3
Total Crust Points 1.4
Total Toppings Points 1.75
Total Crust Doneness 1.2

Subtotal 6.65
Total Pizza Score 6.65

001	More than 25% outside
0	More than 50% cheese and/or toppings on the crust
0	Outer box does not have 75% cheese lock
0	Has uncooked cheese cubes or burnt cheese
099	Outer box missing the correct cheese distribution portions
0	Inner box missing the correct cheese distribution portions
099	Outer box missing the correct portions
0	Inner box missing the correct portions Output results for one piece

| 0.01 | 0 | 0 | 0 | 0 | 0 | 0 | 0 |
| 0 | 0 | 0 | 0 | 0 | 0 | 0 | 0 |
| 0 | 0 | 0.99 | 0 | 0 | 0 | 0 | 0 |
| 0. | 0 | 0.98 | 0 | 0 | 0 | 0 | 0 |
| 0.99 | 0 | 0 | 0 | 0 | 0 | 0 | 0 |
| 0. | 0 | 0.02 | 0 | 0 | 0 | 0 | 0 |
| 0.99 | 0 | 0 | 0 | 0 | 0 | 0 | 0 |
| 0. | 0 | 0.01 | 0 | 0 | 0 | 0 | 0 |

Fig. 6D

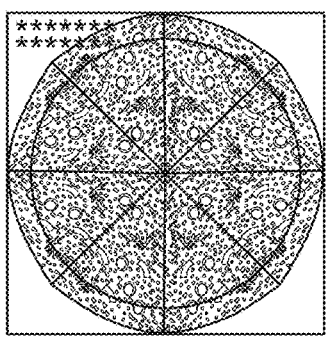
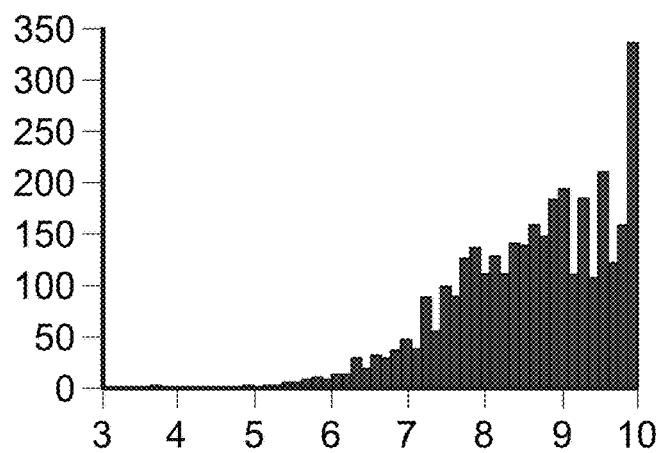

Statistical analysis block

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |
| 0 | 0 | 1 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

Fig. 6F

NEURAL NETWORK-BASED SYSTEMS AND COMPUTER-IMPLEMENTED METHODS FOR IDENTIFYING AND/OR EVALUATING ONE OR MORE FOOD ITEMS PRESENT IN A VISUAL INPUT

CROSS-REFERENCE TO RELATED APPLICATION

This application is a continuation of International Patent Application No. PCT/US2019/047171, filed Aug. 20, 2019, which claims priority to Russian Patent App. No. 2018130482, filed Aug. 22, 2018, each of which is incorporated herein by reference in its entirety.

FIELD OF TECHNOLOGY

The subject matter herein generally relates to food production processes, and specifically relates to utilizing one or more machine learning techniques (e.g., neural network) for identifying and/or evaluating one or more food items in a visual input generated during a production process.

BACKGROUND OF TECHNOLOGY

Fast growing demands for pizzas provide incentives for pizza manufacturers to improve quality and efficiency in pizza productions. However, most pizza manufacturers still use manual monitoring pizza production process, which is causes variation of pizza quality and cost time and human labor.

SUMMARY OF THE INVENTION

In some embodiments, the present invention provides for an exemplary computer system and methods for searching and scoring pizza assisted with video cameras and implemented with improved convolutional neural network (CNN)-based algorithms, which provides advantages of scoring pizzas accurately, thereby resulting an improved accuracy, efficiency, and quality of the pizza production processes.

In some embodiments, the present invention provides for an exemplary inventive convolutional neural network-based and computer-implemented method for identifying and evaluating food production such as pizza production, including: receiving, by a processor, a continuous video stream from at least one camera position over a table configured to receive prepared pizzas; collecting, by the processor, a plurality of pizza containing video frames of a particular pizza from the video stream; applying, by the processor, a first CNN to select a set of best pizza containing video frames of the particular pizza from the plurality of pizza containing video frames; applying, by the processor, the first CNN to identify a best pizza containing image of the particular pizza from the set of best pizza containing video frames; applying, by the processor, the first CNN to localize at least one pizza portion of the particular pizza in the identified best pizza containing image; applying, by the processor, the first CNN to determine a type of the pizza of the particular pizza from the identified best pizza containing image; applying, by the processor, a second CNN to determine a map of pizza components of the particular pizza by automatically performing pizza image segmentation of the pizza portion based on at least the type of the pizza; and applying, by the processor, the second CNN to automatically score the particular pizza based on the determined map of pizza components.

In some embodiments, applying, by the processor, the second CNN to automatically score the particular pizza based on the determined map of pizza components including: dividing, by the processor, the pizza portion of the identified best image into a plurality of slices; grading, by the processor, one of the plurality of slices of the particular pizza; repeating, by the processor, the grading step to grade the remaining slices of the plurality of slices; and determining, by the processor, a final score of the particular pizza based on the grading of the plurality of slices.

In some embodiments, the video frames of the video stream are categorized into cases including:
 i) a first case for images that have no pizza present;
 ii) a second case for images in which a pizza is present and off-centered;
 iii) a third case for images in which the pizza is present and centered, and a pizza image has a resolution quality of X;
 iv) a fourth case for images in which the pizza is present and centered, and the pizza image has the resolution quality of Y, where Y is better than X;
 v) a fifth case for images in which the pizza is present, centered, and a first type, and the pizza image has a desired resolution quality; and
 v) a sixth case for images in which the pizza is present, centered, and a second type, and the pizza image has a desired resolution quality.

In some embodiments, applying the first CNN to select the set of best pizza containing video frames from the pizza containing video frames and to identify the best image are performed by a graphics processing unit (GPU) processor.

In some embodiments, applying the first CNN to select the set of best pizza containing video frames from the pizza containing video frames is performed by a coarse and fast detector.

In some embodiments, selecting the set of best pizza containing video frames from the pizza containing video frames including discounting each pizza containing video frame that has at least one of a motion blur or defocus blur.

In some embodiments, applying the first CNN to identify the best image is performed by an accurate and slow detector.

In some embodiments, the number of the plurality of slices is 8.

In some embodiments, the second CNN has a contraction path and an expansion path.

In some embodiments, the contraction path includes a plurality of convolution and activation layers.

In some embodiments, the contraction path further includes a subsampling and batch normalization layer after a first convolution and activation layer.

In some embodiments, the contraction path further includes a rectified linear unit (ReLU) layer and a pooling layer following each convolution and activation layer before proceeding to a subsequent convolution and activation layer.

In some embodiments, the expansive path includes a sequence of up-convolutions and concatenations configured to combine feature spatial information with high-resolution features from the contracting path.

In some embodiments, the applying the first CNN to localize the at least one pizza portion of the particular pizza in the identified best pizza containing image, including: defining a bounding box; and utilizing one or more pre-determined binary masks.

In some embodiments, the present invention provides for an exemplary inventive convolutional neural network-based and computer-implemented system for identifying and evaluating food production such as pizza production, including: at least one image capturing device; a non-transitory storage memory; one or more processors; and computer program code stored on the non-transitory storage memory and, when executed by the one or more processors, causes the one or more processors to: receiving a continuous video stream from at least one camera position over a table configured to receive prepared pizzas; collecting a plurality of pizza containing video frames of a particular pizza from the video stream; applying a first CNN to select a set of best pizza containing video frames of the particular pizza from the plurality of pizza containing video frames; applying the first CNN to identify a best pizza containing image of the particular pizza from the set of best pizza containing video frames; applying the first CNN to localize at least one pizza portion of the particular pizza in the identified best pizza containing image; applying the first CNN to determine a type of the pizza of the particular pizza from the identified best pizza containing image; applying a second CNN to determine a map of pizza components of the particular pizza by automatically performing pizza image segmentation of the pizza portion based on at least the type of the pizza; and applying the second CNN to automatically score the particular pizza based on the determined map of pizza components.

In some embodiments, the computer program code including instructions for: applying the second CNN to automatically score the particular pizza based on the determined map of pizza components including: dividing the pizza portion of the identified best image into a plurality of slices; grading one of the plurality of slices of the particular pizza; repeating the grading step to grade the remaining slices of the plurality of slices; and determining a final score of the particular pizza based on the grading of the plurality of slices.

In some embodiments, the computer program code includes instructions for applying the first CNN on a GPU processor to select the set of best pizza containing video frames from the pizza containing video frames and to identify the best image.

In some embodiments, the computer program code includes instructions for applying the first CNN to select the set of best pizza containing video frames from the pizza containing video frames is performed by a coarse and fast detector.

In some embodiments, the computer program code includes instructions for applying the first CNN to identify the best image is performed by an accurate and slow detector.

In some embodiments, the present invention provides for an exemplary inventive convolutional neural network-based and computer-implemented non-transitory computer-readable storage medium for identifying and evaluating food production such as pizza production, including processor-executable instructions for: receiving a continuous video stream from at least one camera position over a table configured to receive prepared pizzas; collecting a plurality of pizza containing video frames of a particular pizza from the video stream; selecting a set of best pizza containing video frames of the particular pizza from the plurality of pizza containing video frames; applying a first CNN to identify a best pizza containing image of the particular pizza from the set of best pizza containing video frames; applying the first CNN to localize at least one pizza portion of the particular pizza in the identified best pizza containing image; applying the first CNN to determine a type of the pizza of the particular pizza from the identified best pizza containing image; applying a second CNN to determine a map of pizza components of the particular pizza by automatically performing pizza image segmentation of the pizza portion based on at least the type of the pizza; and applying the second CNN to automatically score the particular pizza based on the determined map of pizza components.

In some embodiments, non-transitory computer-readable storage medium including processor-executable instructions for applying the second CNN to automatically score the particular pizza based on the determined map of pizza components, including: dividing the pizza portion of the identified best image into a plurality of slices; grading one of the plurality of slices of the particular pizza; repeating the grading step to grade the remaining slices of the plurality of slices; and determining a final score of the particular pizza based on the grading of the plurality of slices.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 1-9 show flow diagrams and/or certain computer architectures which are representative of some exemplary aspects of the present invention in accordance with at least some principles of at least some embodiments of the present invention.

FIG. 1 is a schematic view of one embodiment of an architecture (100) for preparing a total pizza score.

FIG. 4A is a top-down view of several pizza images evaluated by a convolutional neural network ("CNN") based on an outside circle of the pizza line 5 of FIG. 3B.

FIG. 4B is a top-down view of pizza images examined by a CNN for different crust sizes.

FIG. 5 is a table (500) illustrating the calculation of a total score of a pizza.

FIG. 6C is one embodiment of output results of the grading/scoring operation step (606) for one slice of a pizza.

FIG. 6D illustrates one embodiment of a CNN output post-grading matrix (604) for several slices of a pizza.

FIG. 6E illustrates a statistical analysis block of a CNN post-processed matrix (610) for improving the quality of the score.

FIG. 6F illustrates an improved score matrix in binary form (612) for determining the final score.

FIG. 7 is a schematic view of one embodiment of a workflow (700) for identifying and evaluating a pizza via a CNN.

FIG. 8 is a schematic view of one embodiment of a workflow (800) for scoring a pizza using a CNN.

FIG. 9 is a schematic view of one embodiment of a CNN-based and computer implemented system (900) for searching and scoring a Food Object (902).

DETAILED DESCRIPTION OF THE INVENTION

Figure 2A:
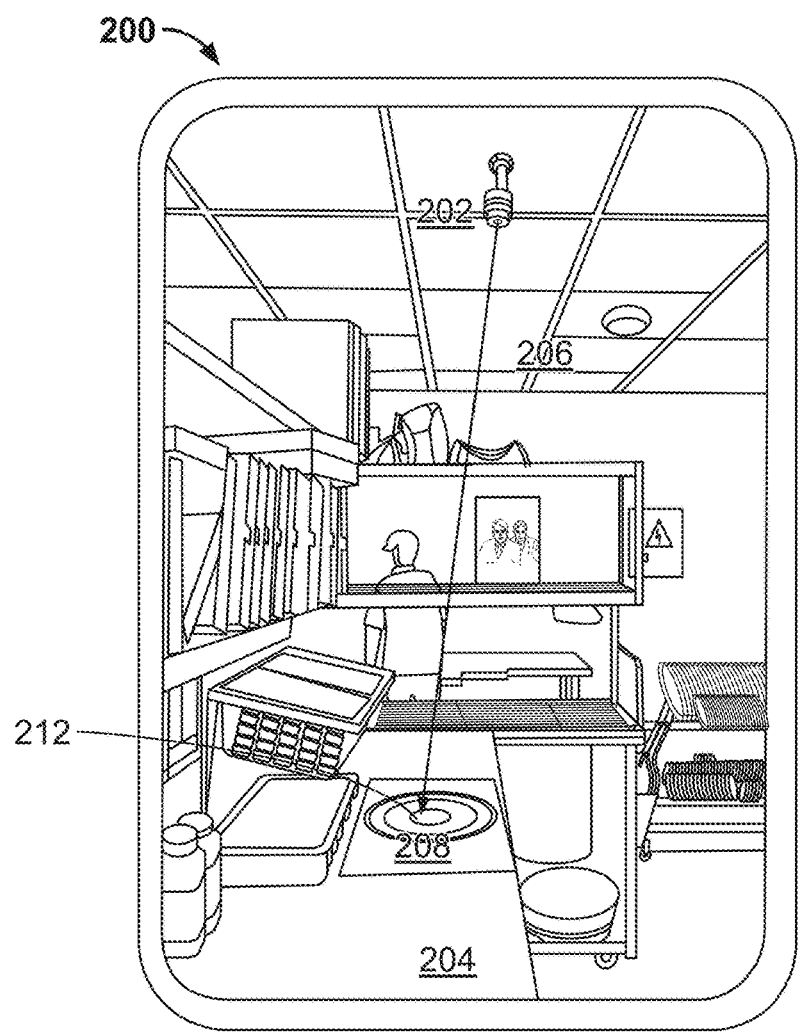
FIG. 2A is a perspective view of one embodiment of a set up (200) for identifying and evaluating food production.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive. For example, while numerous embodiments and examples of the present invention are provided with respect to evaluating pizzas, it understood that many modifications may become apparent to those of ordinary skill in the art a skilled artisan such as, without limitation, of applying the principles of the present invention to score other foods that may be susceptible to visual classification and scoring (e.g., cakes, breads, and other baked items; various prepared food (e.g., grilled chicken), etc.).

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "runtime" corresponds to any behavior that is dynamically determined during an execution of a software application or at least a portion of software application.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive electronic systems are associated with electronic mobile devices (e.g., smartphones, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, a plurality of concurrent users (e.g., pizza making facilities/stations) can be, but is not limited to, at least 2 (e.g., but not limited to, 2-10), at least 10 (e.g., but not limited to, 10-100), at least 100 (e.g., but not limited to, 100-1,000), at least 1,000 (e.g., but not limited to, 1,000-10,000), and etc.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript, Python, Perl). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp", etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," "Sly," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor, central processing unit (CPU), or graphics processing unit (GPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In one example implementation, a multi-processor system may include a plurality of processor chips each of which includes at least one I/O component which is designed to directly connect to photonic components to connect to at least an I/O device. In some embodiments, the I/O device may be a standard interface, such as peripheral component interconnect express (PCIe), universal serial bus (USB), Ethernet, Infiniband, and the like. In some embodiments, the I/O device may include a storage device.

In one example implementation, a multi-processor system may include plurality of photonic components and an off-chip memory. The off-chip memory may be shared by more than one of the processor chips. The off-chip memory may be directly connected to a single processor chip and shared with other processor chips using a global memory architecture implemented by using a processor-to-processor approach. The multi-processor system may also include a cache and a plurality of processor chips each of which includes at least one I/O component which is designed to directly connect to the photonic components to communicate with one or more other processor chips. At least one I/O component of at least one of the processor chips may be configured to use a directory-based cache-coherence protocol. In some embodiments, a cache of at least one of the processor chips may be configured to store directory information. In some embodiments, the off-chip memory may include a DRAM. In some embodiments, directory information may be stored in the off-chip memory and the on-chip cache of at least one of the processor chips. In some embodiments, the multi-processor system may further include a directory subsystem configured to separate the off-chip memory data and the directory information on to two different off-chip memories. In some embodiments, the multi-processor system may further include a directory subsystem configured with some of the subsystem implemented on a high performance chip which is part of the 3D DRAM memory stack. In some embodiments, the multi-processor system may further include a directory subsystem configured to support varying numbers of sharers per memory block. In some embodiments, the multi-processor system may further include a directory subsystem configured to support varying numbers of sharers per memory block using caching. In some embodiments, the multi-processor system may further include a directory subsystem configured to support varying numbers of sharers per memory block using hashing to entries with storage for different numbers of pointers to sharers. In some embodiments, the multi-processor system may further include a directory subsystem configured to use hashing to reduce storage allocated to memory blocks with zero sharers.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Illustrative Examples of the Inventive CNN-Based and Computer-Implemented Methods for Searching and Scoring of Pizza Among a Video Stream Illustrative Examples of the Overall Inventive Architecture In some embodiments, the present invention provides an exemplary inventive CNN-based and computer-implemented system that is configured to identifying and evaluating food production such as pizza production based on visual input (e.g., video stream, etc.). FIG. 1 shows an exemplary overall architecture 100 that may implement the exemplary inventive CNN-based and computer-implemented system for identifying and evaluating food production such as pizza production. In some embodiments, the architecture saves a video stream via a Smart Video Saver 1, which is described herein in connections with FIGS. 2A-B and FIGS. 3A-B. The saved video stream comprise one or more video parts Videos 1, 2, 3, . . . N.

In some embodiment, Videos 1, 2, 3, . . . N of the video stream are provided as input to an exemplary inventive Pizza Detector 2 in which video frames of one or more of Videos 1, 2, 3, . . . N which don't have motion and/or defocus blur are processed by the Pizza Detector 2 to identify one or more best potential video frames. In some embodiment, the best potential video frames are then processed by Pizza Detector 2 by applying an exemplary trained inventive convolutional neural network to identify the best video frame having the pizza image of the best resolution.

In some embodiments, the exemplary inventive Pizza Detector 2 is configured to classify video frames of Videos 1, 2, 3, . . . N into cases that may be defined such as, but not limited to:
case 1: no pizza present;
case 2: pizza is present but located of center of the frame image;
case 3: pizza is present, centered, and has a resolution quality of X;
case 4: pizza is present, centered, and has a resolution quality of Y, where Y is better than X;
case 5: pizza is present, centered, having the desired resolution quality, and is Regular type;
case 6: pizza is present, centered, having the desired resolution quality, and is White (ricotta) type; . . . etc.

In some embodiments, the exemplary inventive Pizza Detector 2, utilizing the exemplary inventive CNN, which has been trained to classify Videos 1, 2, 3, . . . N based on the predetermined cases, to identify at least one frame that contain the best image of particular type of pizza (e.g., centered, having the desired resolution quality, and is White (ricotta) type). In some embodiments, if the video frames contain a pizza; and identify a location (localization) of the exemplary inventive CNN may be trained based, at least in part, on defining a bounding box 102 and one or more binary masks that may allow to discount, for example, without limitation, background pixels in a frame.

In some embodiments, the one or more binary masks provide data that is in a binary form used for bitwise operations, particularly in a bit field. Using a mask, multiple bits in a byte, nibble, word etc. can be set either on, off or inverted from on to off (or vice versa) in a single bitwise operation. According to some embodiment of the exemplary inventive CNN-based and computer-implemented system, the one or more binary masks consist of zeros and digits where each digit states the fact that this pixel matches to a pizza.

In some embodiments, the exemplary inventive Pizza Detector 2 is configured to apply the exemplary inventive CNN to extract best images (e.g., 10 best images) from the Videos 1, 2, 3, . . . N. In some embodiments, extract best images is performed on a GPU.

In some embodiments, the exemplary inventive Pizza Detector 2 comprises two detectors: an exemplary inventive coarse and fast detector and an exemplary inventive an accurate and slow detector. In some embodiments, the exemplary inventive coarse and fast detector, utilizing the exemplary inventive CNN, which has been trained to adopt an approach based on an exemplary inventive support vector machines (SVM, also support vector networks) and an exemplary inventive histogram of oriented gradients (HOG) and configured to extract best images (e.g., 10 best images) from the Videos 1, 2, 3, . . . N.

In machine learning, the exemplary inventive SVM utilizes the exemplary inventive CNN, which has been trained to supervised learning models with associated learning algorithms that analyze data used for classification and regression analysis. Given a set of training examples, each marked as belonging to one or the other of two categories, an exemplary inventive SVM training algorithm builds a model that assigns new examples to one category or the other, making it a non-probabilistic binary linear classifier (although methods such as Platt scaling exist to use SVM in a probabilistic classification setting). An exemplary inventive SVM model is a representation of the examples as points in space, mapped so that the examples of the separate categories are divided by a clear gap that is as wide as possible. New examples are then mapped into that same space and predicted to belong to a category based on which side of the gap they fall.

In some embodiments as used in the present invention, applying the exemplary inventive CNN, models are trained on dataset that is collected from one or more cameras such as IP camera 202 of FIG. 2, which is described herein. In some embodiments, models are trained using SVM.

In some embodiments, the dataset contains around 9000 images with bounding boxes 102 markup. In some embodiments, for each pizza, there is a type label that is to be identified by an exemplary inventive Pizza Classifier 3 described in detail herein. Then the one or more exemplary inventive binary masks of pizza is made for around 90 images (around 1%) of the 9000 images of the dataset.

In some embodiments, the exemplary inventive HOG is a histogram of oriented gradients descriptor that is used in computer vision and image processing for the purpose of object detection. The exemplary inventive HOG utilizes the exemplary inventive CNN, which has been trained to count occurrences of gradient orientation in localized portions of an image. In some embodiments, the exemplary inventive HOG utilizes the exemplary inventive CNN, which has been trained to describe local object appearance and shape within an image by the distribution of intensity gradients or edge directions. The image is divided into small connected regions called cells, and for the pixels within each cell, a histogram of gradient directions is compiled. The descriptor is the concatenation of these histograms. For improved accuracy, the local histograms can be contrast-normalized by calculating a measure of the intensity across a larger region of the image, called a block, and then using this value to normalize all cells within the block. This normalization results in better invariance to changes in illumination and shadowing.

In some embodiments, the exemplary inventive CNN has been trained to apply to the best images to make accurate localization. The exemplary inventive CNN has been further trained to check if images are not blurred before feeding the images to detectors according to some embodiments.

In some embodiments, the exemplary inventive accurate and slow detector is based on the exemplary inventive CNN, which has been trained to apply to the best images to make accurate localization. The exemplary inventive accurate and slow detector further utilizes the exemplary inventive CNN, which has been trained to check if images are not blurred before feeding the images to detectors according to some embodiments.

In some embodiment, the selected best frame is sent to an exemplary inventive Pizza Classifier 3 using the CNN to determine: the type of the pizza and/or a type of crust, such as but not limited to thin crust, traditional crust, and pan curst. Some exemplary types of the pizza that may be identified by the exemplary inventive Pizza Classifier 3 of the exemplary inventive CNN-based and computer-implemented system includes but not limited to Pepperoni, Sausage, Mushroom, Green Pepper, Tomato, Canadian Bacon, Pepperoni/sausage (only grade pepperoni), Pepperoni/Tomato (only grade pepperoni), Pepperoni/Mushroom (only grade pepperoni), Pepperoni/Bacon (only grade pepperoni), Pepperoni/Onion (only grade pepperoni), Pepperoni/Canadian Bacon (only grade pepperoni), Pepperoni/Green Pepper (only grade pepperoni), Tomato/sausage, Tomato/Mushroom, Tomato/Onion (only grade tomato), Tomato/Bacon (only grade tomato), Tomato/Canadian Bacon, Mushroom/sausage, Mushroom/Bacon (only grade Mushroom), Mushroom/Canadian Bacon, Green pepper/Sausage, Green Pepper/Tomato, Green Pepper/Bacon (only grade Green Pepper), Green Pepper/Onion (only grade Green Pepper), Green Pepper/Canadian Bacon, Canadian Bacon/Onion (only grade Canadian Bacon), Canadian Bacon/Bacon (only grade Canadian Bacon), Canadian Bacon/Sausage.

In some embodiments, the exemplary inventive Pizza Classifier 3 utilizes the exemplary inventive CNN, which has been trained to identify up to 21 types of pizza with a pre-defined accuracy. In some embodiments, the accuracy can be achieved to be at least 80%. In some embodiments, the accuracy can be achieved to be at least 85%. In some embodiments, the accuracy can be achieved to be at least 90%. In some embodiments, the accuracy can be achieved to be at least 95%. In some embodiments, the accuracy can be achieved to be between 80-100%. When the type of the pizza is determined, the selected best frame is sent to the input of the next CNN of an exemplary inventive Scorer 4, which applies an improved architecture of CNN. The exemplary inventive Scorer 4 utilizes the exemplary inventive CNN, which has been trained to provide a map of dough, cheese and other ingredients to perform pizza quality examination and scoring based on the map of dough, cheese and other ingredients, which is illustrated herein in connection with FIGS. 4-5.

Searching of Pizza Among a Video Stream

In some embodiments, the exemplary inventive CNN-based and computer-implemented system may be performed in connection with one or more cameras installed in proximity of the pizza to be searched. FIG. 2A shows an exemplary inventive set up 200 that may implement the CNN-based and computer-implemented system for identifying and evaluating food production such as pizza production.

In some embodiments, the exemplary inventive CNN-based and computer-implemented system uses an Internet Protocol camera, or IP camera 202, which is a type of digital video camera employed for surveillance, and which can send and receive data via a computer network and the Internet. Such IP camera is either centralized (requiring a central network video recorder (NVR) to handle the recording, video and alarm management) according to some embodiments, or decentralized (no NVR needed, as camera can record to any local or remote storage media) according to some other embodiments. In some embodiments, the camera used has a resolution of 4 Megapixel—1920×1080 (Full High-Definition (HD)) and up to 4 streams H.264/MJPEG, 25 fps. In some embodiments, view angle of the camera is no less than 32-87° (horizontal) and 18-46° (vertical). In some embodiments, the minimum range between the camera and the object (e.g., pizza) is around 1 meter.

The above configuration enables the exemplary inventive CNN-based and computer-implemented system to access to web interface and camera settings, access to video streaming (at least one channel), and sufficiently suitable resolution images of pizzas according to some embodiments.

In some embodiments, one or more video cameras 202 are fixed above a cutting table 204 registering activity on the cutting table. In some embodiments, the camera is mounted on a ceiling panel 206 right above the cutting table 204 with 2 self-tapping screws. All wiring may be hidden inside the ceiling. The receptacle to plug the camera in may optionally be inside the ceiling. The camera 202 is mounted on the ceiling 206 and be pointed at the middle of the cutting board 208 that is placed on the cutting table 204. In some embodiments, the camera is mounted with minor inclination of between 2 to 5 cm.

Figure 2B:
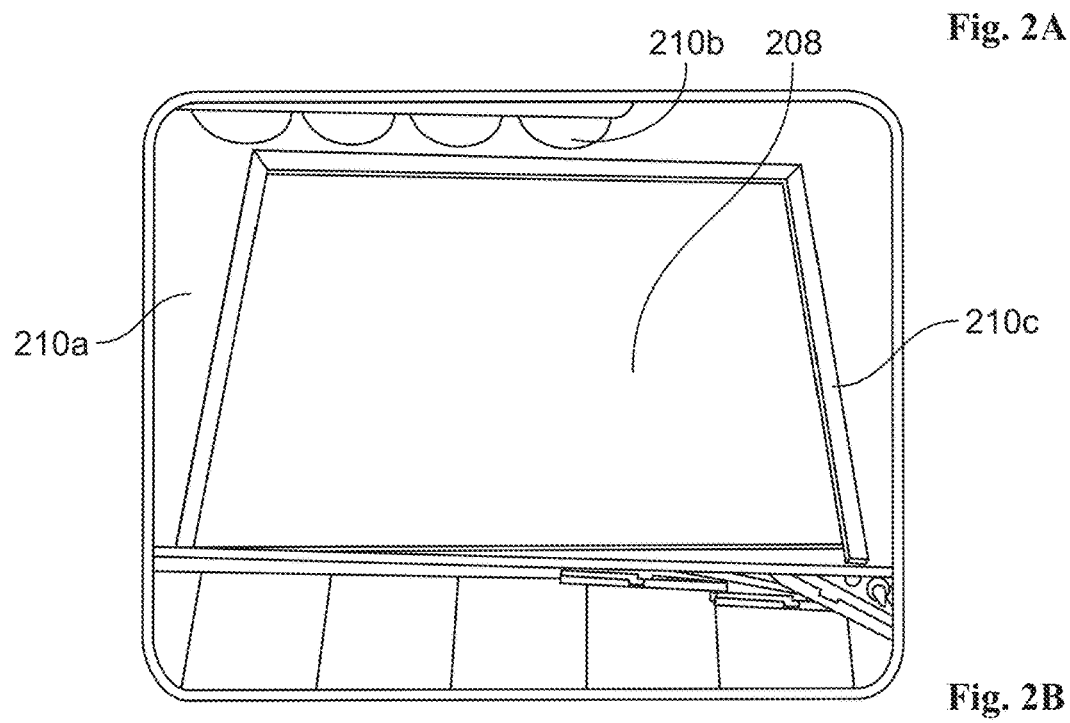
FIG. 2B is a perspective view of one embodiment of a cutting board (208) for use with set up (200) of FIG. 2A.

FIG. 2B shows a board 208 placed on the cutting table 204 in the exemplary inventive set up as shown in FIG. 2A according to some embodiments. In some embodiments, the cutting board 208 is fixed on the table 204 with aluminum bars 210*a-c* configured to remain inside the cutting board. The bars 210*a-c* may be glued with but not limited to non-hazardous glue. The black circle 212 on the cutting board 208 of FIG. 2A represents a pizza. The camera 202 is configured to capture a pizza placed anywhere on the cutting board 208.

In some embodiments, network settings may be changed according to particular network configurations or a particular external IP of each restaurant.

If the capturing activity is continued more than a pre-determined period of time, e.g., 3 seconds, such a video is downloaded to a server and then processed by the search algorithm. In some embodiments, each camera may save up to 1-1500 short videos per day. In some embodiments, each camera may save up to at least 500 short videos per day. In some embodiments, each camera may save up to at least 1000 short videos per day.

In some embodiments, the searching algorithm is performed by the exemplary inventive Pizza Detector 2 of FIG. 1 applying the exemplary inventive CNN. All video frames which don't have motion and/or defocus blur are processed by the exemplary inventive CNN for a decision procedure.

In some embodiments, the searching algorithm is performed by the exemplary inventive coarse but fast detector of the exemplary inventive Pizza Detector 2 of FIG. 1. All video frames which don't have motion and/or defocus blur are processed by the fast detector based on exemplary inventive descriptors HOG and using a linear exemplary inventive SVM as a decision procedure.

A set of N best video frames are selected by the value of confidence in which N is a non-zero integer (e.g., 3, 5, 10, 15 etc.). In some embodiment, N may be any integer between 1 to 20. In some embodiment, N may be at least 5. In some embodiment, N may be at least 10. In some embodiment, the confidence is 95%. In some embodiment, the confidence may be changed after re-training the searching algorithm.

In some embodiments, the set of N best video frames are processed and selected by the exemplary inventive Pizza Detector 2 of FIG. 1 applying the CNN. The best video frame is selected from the set with confidence more than a pre-determined value of confidence such as 95%. If there is no video frame with confidence more than the pre-determined value of confidence, the algorithm finishes its work.

In some embodiments, the set of N best video frames are processed and selected by the exemplary inventive accurate and slow detector of the exemplary inventive Pizza Detector 2 of FIG. 1. The best video frame is selected from the set with confidence more than a pre-determined value of confidence such as 95%. If there is no video frame with confidence more than the pre-determined value of confidence, the algorithm finishes its work.

Scoring of Pizza

Figure 3A:
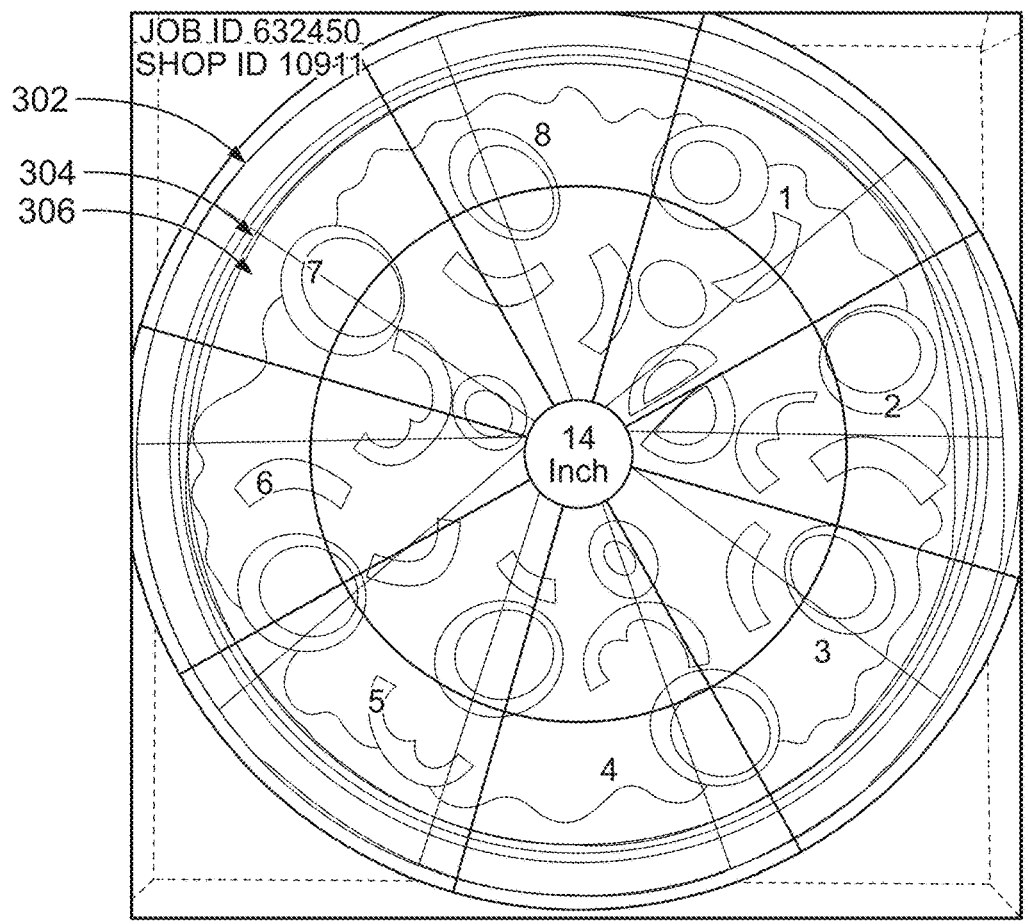
FIG. 3A is a top-down view of one embodiment of a selected frame of a pizza image divided into 8 equal slice/sectors and with outside circle (302).

FIG. 3A shows an exemplary selected best frame of pizza image 300 that may be further examined by the CNN-based and computer-implemented system according to some embodiments. In some embodiments, the type and size of the pizza is determined based on the selected frame 300 by the exemplary inventive CNN-based and computer-implemented system. In some embodiments, the size is determined based on the pizza's diameter on the selected frame in pixels.

In some embodiments, the Classifier 3 of FIG. 1 utilizes the exemplary inventive CNN, which has been trained to determine the type of pizza as discussed above in connection with FIG. 1. If the algorithm cannot confidently recognize the type of pizza it finishes its work.

Then the selected frame is sent to the input of the next CNN operated by the Scorer 4 of FIG. 1, utilizing the exemplary inventive CNN, which has been trained to perform pizza image segmentation, and thereby providing as output a map of dough/crust, cheese and toppings. The dough/crust, toppings, cheese, and doneness of the pizza are is examined and scored individually as described herein. A total score, which is a combination of the scores of dough/crust, toppings, cheese, and doneness, provides an overall evaluation of the quality of the pizza. In some embodiments, the Scorer 4 of FIG. 1 utilizes the exemplary inventive CNN, which has been trained to score the quality of the pizza based on the map of ingredients.

An exemplary way of processing the pizza portion of the image is by 1) defining a crust; 2) defining a cheese lock as describe herein; 3) determining how much toppings are within the cheese lock; 4) evaluate the pizza dough by examining the pizza and determining the color of the dough; and 5) score each slice of the pizza portion of the image to determine if the crust is properly risen and sized.

According to some embodiments of the exemplary inventive CNN-based and computer-implemented system, during the scoring or examination, pizza's circle, which is a pizza portion of the best image identified by the exemplary inventive CNN, is defined by the outside circle 302. Cheese lock is defined by circles 304 and 306 with variation such as ±3 mm. The pizza portion of the image is divided into 8 equal slice/sectors 1-8 as shown in FIG. 3A. In some embodiments, pizza's circle is divided into N equal slice/sectors, in which N is a non-zero integral. In some embodiments, each sector is evaluated independently with each other.

Figure 3B:
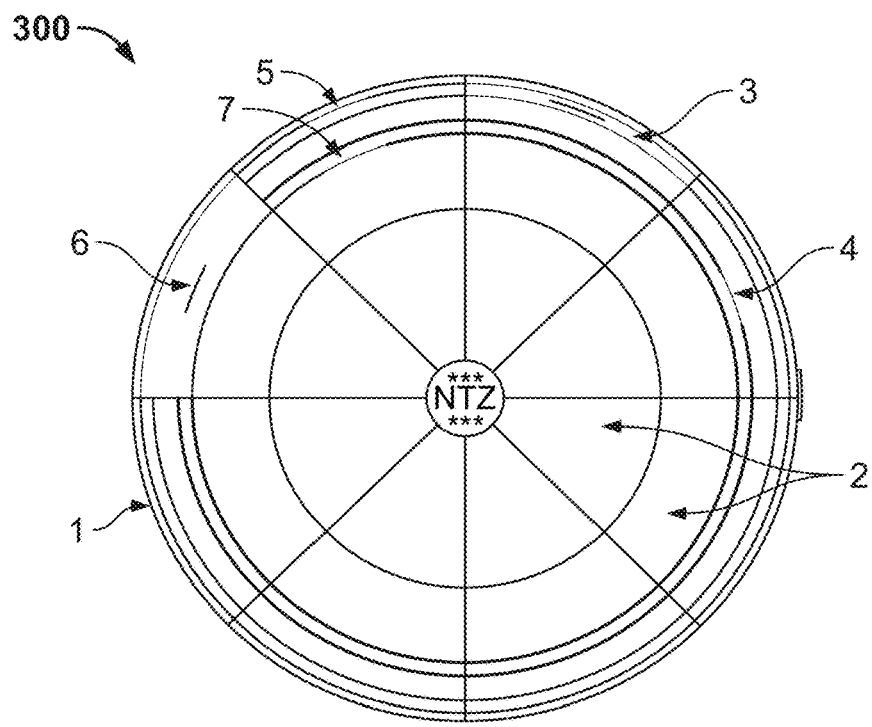
FIG. 3B is a top-down view of one embodiment of a selected frame of a pizza image (300) shown in further detail by lines 1 and 5 and areas 2, 3, 4, 6, and 7 and non-topping zone NTZ.

According to pizza's map of components, an exemplary contour of a pizza may be defined in further detail by lines shown in FIG. 3B. As shown in FIG. 3B, NTZ indicates non-topping zone. Line 1 defines maximum outside circle of the pizza. Areas 2 define inner box and outer box of the pizza portion according to some embodiment. Area 3 defines an outside border for pre-baked pizza. In some embodiments, the outside border allows a gap. In some embodiment, the gap may be without limitation ±3 mm. Area 4 defines boundary of sauce of the pizza. In some embodiments, the boundary 4 allows a variation such as ±3 mm. Line 5 shows a standard outside circle of the pizza. Area 6 shows a permissible standard radius of the pizza edge. In some embodiment, the permissible standard radius of the pizza edge is 5 cm. Area 7 defines a cheese lock line. In some embodiments, the cheese lock 7 allows a gap. In some embodiment, the gap is ±3 mm. Thresholds of permissible gap, such as ±3 mm, enable practically determination of the size. Specifically, the radius concentric circles are moderated to be within ideal radius ±3 mm.

According to some embodiment, initially a pizza is scored as 10 points and then the score is reduced due to the penalty points recognized during an evaluation of each of the sector of the pizza.

In some embodiments, the exemplary inventive CNN has been trained to perform a pizza's crust examination to determine if the crust is properly risen and sized. The curst examination includes but not limited to a size examination and examination of crust's cleanness.

According to some embodiments, the exemplary inventive CNN has been trained to perform the size examination based on pizza's map of components comprising images with the one or more binary masks. For example, the pizza's center is determined as the center of mass of the pizza's map of components. For example, the pizza's size (e.g., 23 cm, 30 cm, 35 cm, 40 cm, etc.) is determined based on the number of pizza's pixels of the pizza image within the frame.

FIG. 4A shows exemplary pizzas that the exemplary inventive CNN has been trained to evaluate based on outside circle of the pizza Line 5 allowing a gap such as ±Z mm (e.g., 1, 2, 3, 4, 5, 6, 7, 8, 9, 10, 1-15 according to some embodiments. In case more than Y % (e.g., 5%, 10%, 15%, 20%, 25%, etc.) of the contour of some sector is located out of the concentric circles, this sector causes the penalty of X point (e.g., 0.1).

Some evaluation standards applied by the exemplary inventive CNN are shown in FIG. 4B, in which the slices on top have acceptable size of the crusts. The slices on the bottom left illustrate exemplary small crusts whereas the one on the bottom right illustrate exemplary big crusts.

Figure 4C:
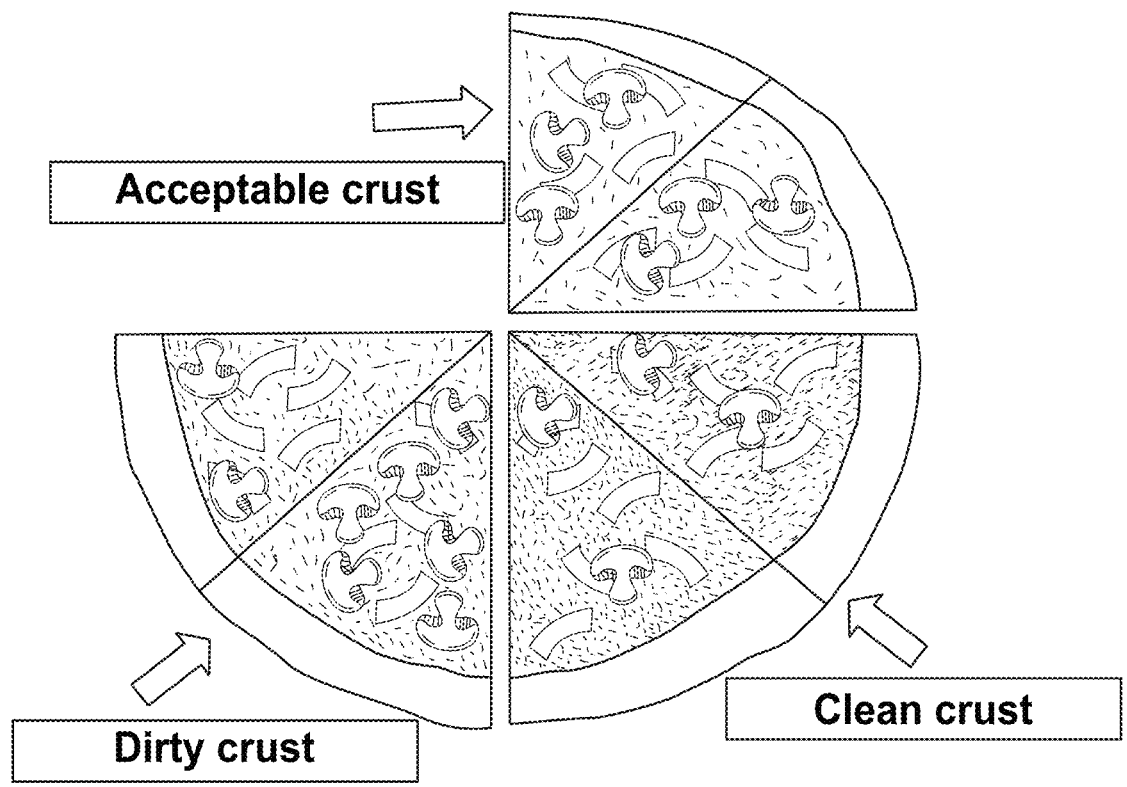
FIG. 4C is a top-down view of pizza images examined by a CNN for different crust's cleanness.

In some embodiments, the exemplary inventive CNN has been trained to perform the examination of crust's cleanness. The location of crust is determined based on the pizza's center and its radius according to some embodiment. In case more than 50% of crust area of some sector is covered with cheese or topping, this sector causes the penalty of 0.1 point. Some evaluation standards applied by the exemplary inventive CNN are shown in FIG. 4C, in which the slices on top have acceptable crust cleanness. The slices on the bottom left illustrate exemplary dirty crusts whereas the ones on the bottom right illustrate exemplary clean crusts.

In some embodiments, the exemplary inventive CNN has been trained to perform a pizza's topping examination to determine if the toppings and cheese are evenly distributed.

Figure 4D:
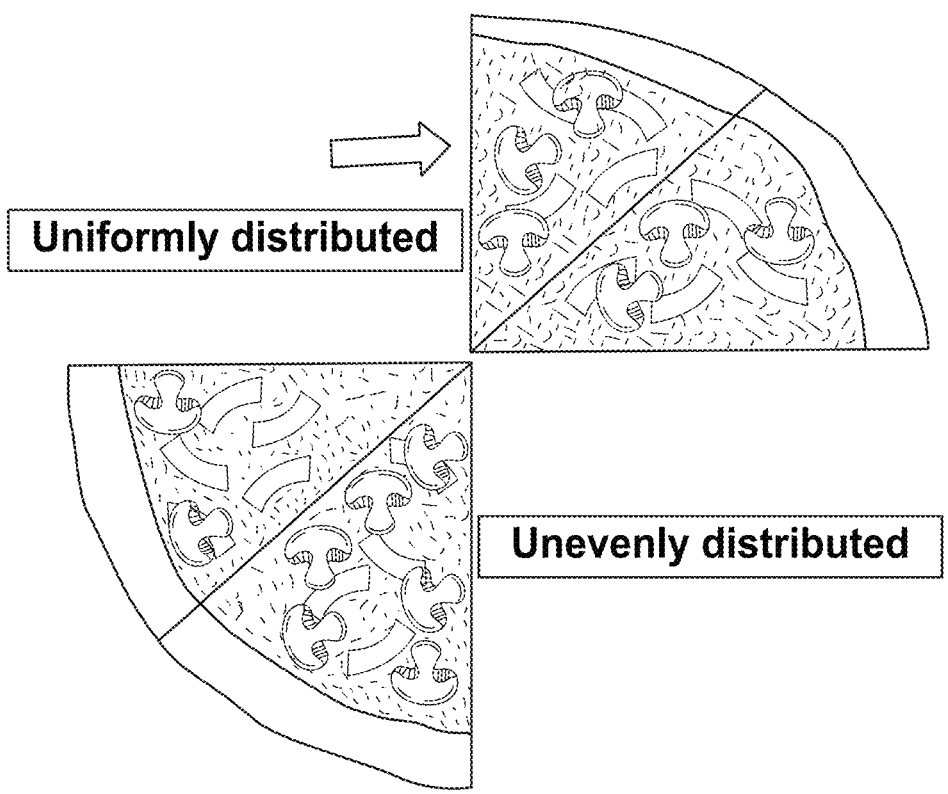
FIG. 4D is a top-down view of pizza images examined by a CNN for different pizza topping distributions.

Some exemplary topping distributions of the pizza slices are shown in FIG. 4D, in which the slices on top have uniformly distributed toppings whereas the ones at the bottom have unevenly distributed toppings.

In some embodiment, during topping examination each of the 8 sectors is divided by a circular curve into two parts: inner box and outer box shown as Area 2 of FIG. 3B as discussed herein. The number of pixels for each type of toppings is calculated for each of the inner box and the outer box separately. In case the amount of some toppings in the inner box or the outer box is less than that specified in the rules, this part of the sector causes the penalty of 0.25 point. The minimum amount of toppings for each type and size of the pizza is set during the process of the algorithm's education (according to the conditions of error minimizations on educational sample).

Figure 4E:
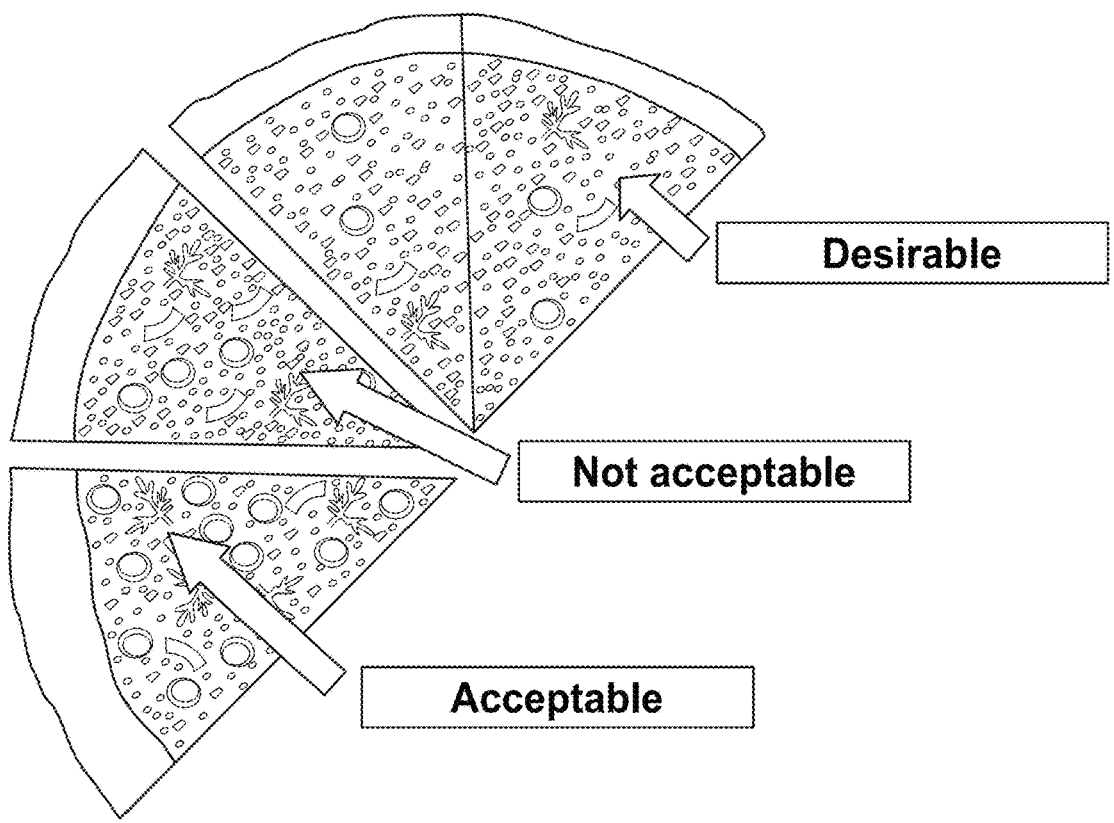
FIG. 4E is a top-down view of pizza images examined by a CNN for different pizza cheese distributions.

In some embodiments, the exemplary inventive CNN has been trained to perform a pizza's cheese examination to determine if the cheese can be evenly distributed with a proper amount, i.e., no red edge. Some exemplary cheese distributions of the pizza slices are shown in FIG. 4E, in which the slices on top have sufficiently suitable distribution. The slice in the middle does not have sufficiently suitable distribution. And the one at the bottom does not have sufficiently suitable but acceptable distribution.

In certain embodiment, the exemplary inventive CNN has been trained to examine the boundary between crust and cheese: at least 75% of the cheese should lie inside the smaller concentric circle padding zone or the inner box (also not farther than 3 mm for example without limitation), if not then this sector may be penalized (−0.1 point, up to −0.8 for the whole pizza).

If less than 75% of non-topping area in each segment of every inner box and out box is covered with cheese (too much crust) then it is penalized by deducing 0.1 point, up to deduction of 1.6 for the whole pizza. The sectors with burnt/half-baked/bubbly cheese are also penalized by deducing 0.1 point, up to deduction of 0.8 point for the whole pizza.

In some embodiments, the exemplary inventive CNN has been trained to perform a pizza's crust doneness examination to determine if the crust doneness is to the extent that the cheese is thoroughly melted, there are no burnt toppings, and the crust is golden brown.

Figure 4F:
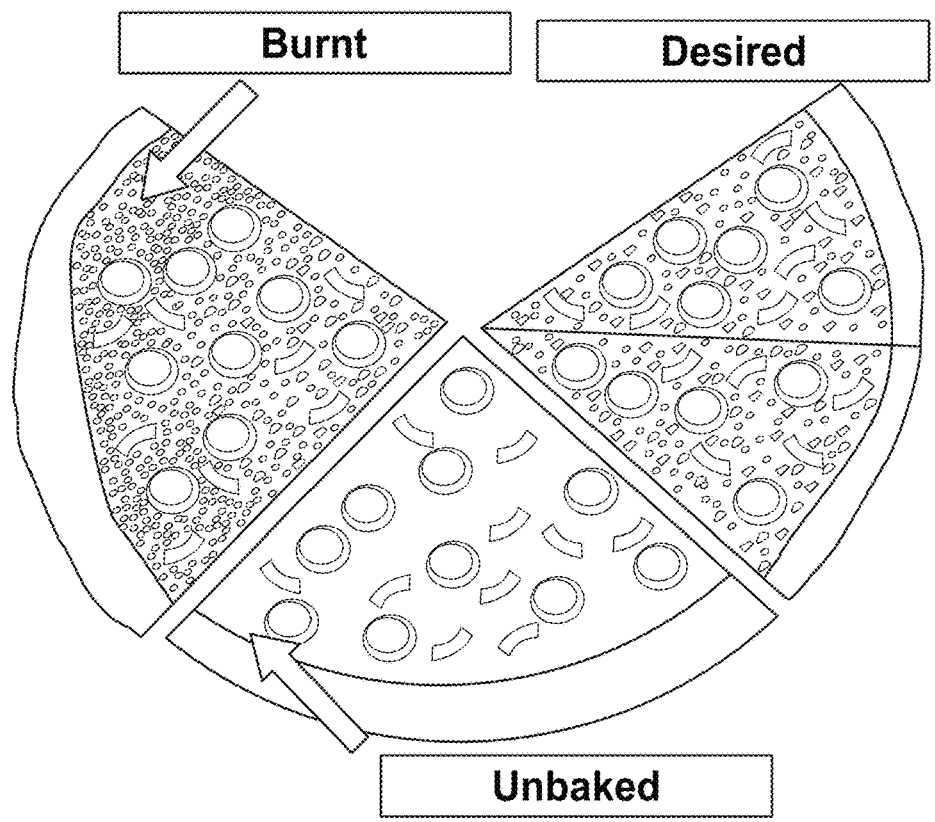
FIG. 4F is a top-down view of pizza images examined by a CNN for different pizza degrees of doneness.

Some exemplary pizza slices with different degrees of doneness are shown in FIG. 4F, in which the slices on top left are burnt. The slices on top right are normal/good degree of doneness. And the slices at the bottom are unbaked.

Figures 4G, 4H:
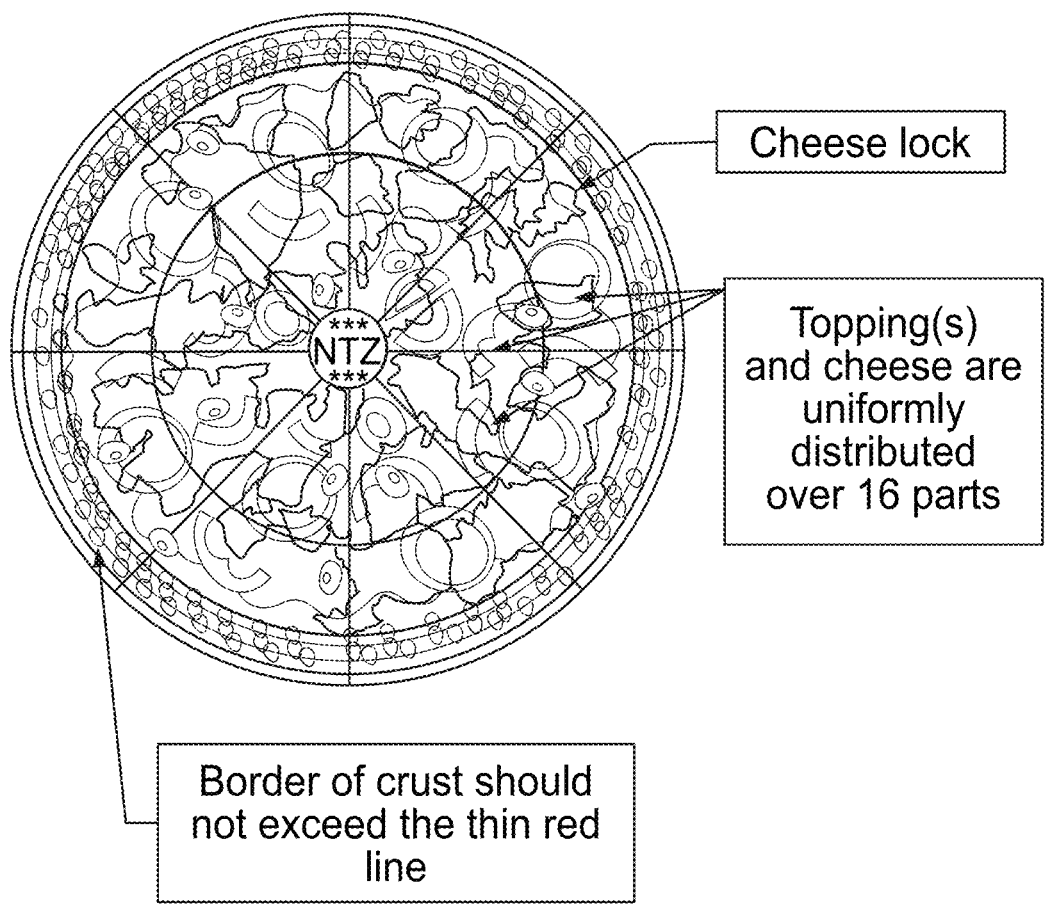
FIG. 4G is top-down view of one embodiment of a map that provides a standard for grading pizza "doneness" or completion progress.
FIG. 4H is a top-down view of one embodiment of a pizza image with uniformly distributed toppings and cheese.

In some embodiments, the dough/pizza crust is evaluated by colors at both top and bottom of the pizza. FIG. 4G shows an exemplary color map that provides a standard for deciding and grading doneness of the pizza. The color map consists of a top chart and a bottom chart showing different colors which indicate different degrees of doneness of the top and bottom of the pizza respectively and corresponding scores for each range of color.

FIG. 4H shows an exemplary ideally produced pizza with an outside circle fallen on the standard outside border (thin red line) and toppings and cheese being uniformly distributed in 16 parts defined by the outside border and cheese lock (thick red line).

FIG. 5 provides an exemplary table 500 that shows the calculation of a total score of an exemplary pizza based on scores calculated from the crust examination, topping examination, cheese examination, and crust doneness examination performed by the exemplary inventive CNN according to some embodiments.

In the example describe herein in FIG. 5, each of the total crust points, total toppings points, total cheese points, and total crust doneness points are calculated according the rules as described above in connection with FIG. 4.

The total pizza score is by adding the scores from the crust examination, topping examination, cheese examination, and crust doneness examination. In the example describe herein in FIG. 5, the total score (6.65)=total crust points (1.4)+total toppings points (1.75)+total cheese points (2.3)+total crust doneness (1.2).

Figure 6A:
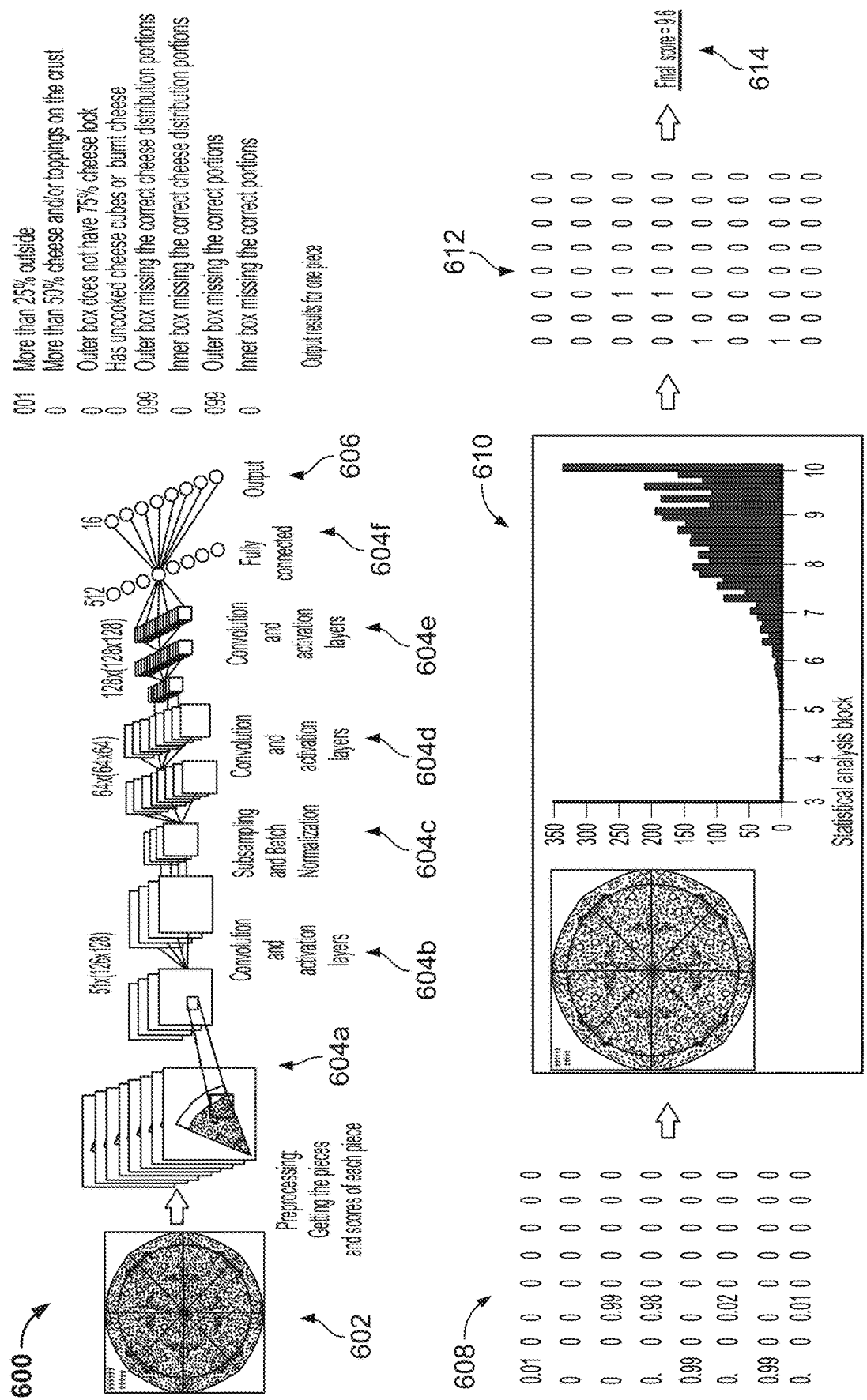
FIG. 6A is a schematic view of one embodiment of an inventive score architecture (600) utilizing a CNN.
Figure 6B:
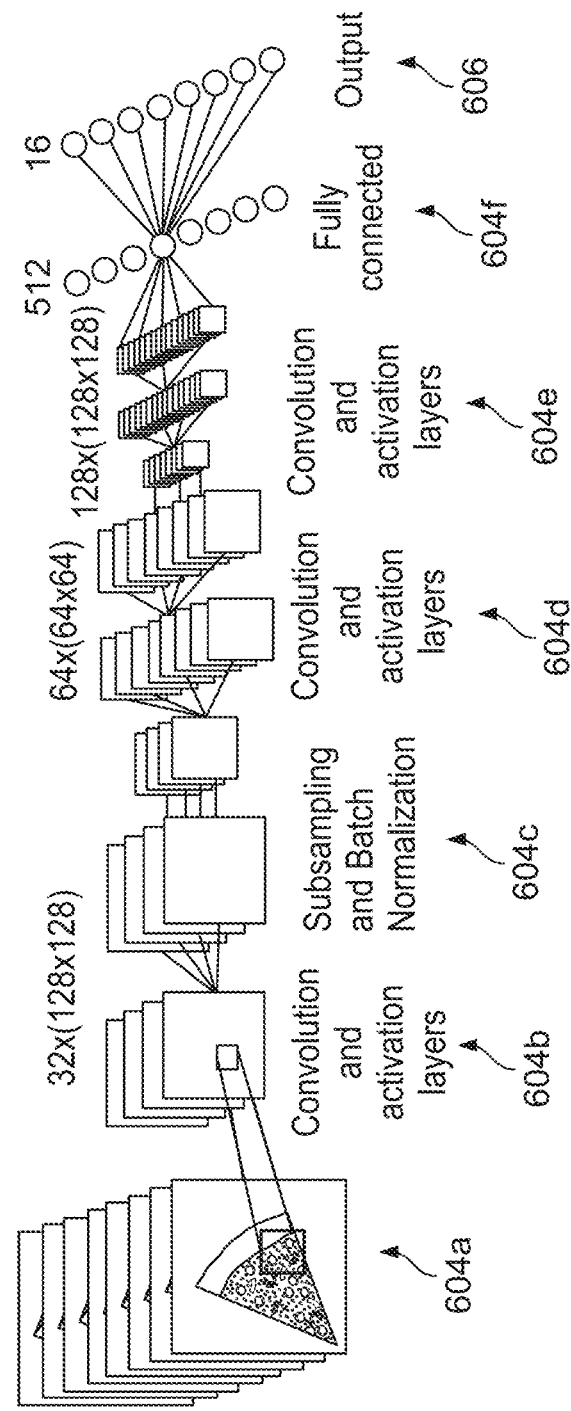
FIG. 6B is a schematic view of two steps of an inventive score architecture: segmentation operation steps (604a-f) and grading/scoring operation step (606).

FIG. 6A provides an exemplary inventive score architecture 600 that utilizes the exemplary inventive CNN, which has been trained to implement the above described methods according to some embodiments. At step 602, a selected best pizza image is provided as the input of the exemplary inventive scoring architecture. Then the scoring procedure contains two main steps: segmentation operation step 604 and grading/scoring operation step 606 (both magnified in FIG. 6B).

Step 604 is the segmentation of the pizza image. In some embodiment, a exemplary inventive U-net CNN has been trained to perform this step. According to some embodiment, at substep 604a, the exemplary inventive score architecture 600 utilizes the exemplary inventive U-net CNN, which has been trained to segment the pizza image into N slices in which N is a non-zero integer. In some embodiment, N=8, and the 8 slices are the defined layered for further processing to determine a respective score for each segmented piece.

In some embodiment, the exemplary inventive U-net CNN has been trained to implement a network that consists of a contracting path and an expansive path, which gives it the u-shaped architecture. During an exemplary inventive contraction path of the exemplary inventive U-net CNN, the spatial information is reduced while feature information is increased.

Particularly, the exemplary inventive contracting path is a convolutional network that consists of repeated application of convolution and activation layers (substeps 604b, 604d and 604e). In some embodiments, after the first convolution and activation layer substep 604a, a subsampling and batch normalization layer substep 604c is applied.

In some embodiments, each exemplary inventive convolution and activation layer is followed by an exemplary inventive rectified linear unit (ReLU) layer and an exemplary inventive pooling layer before proceeding with the next convolution and activation layer. The exemplary inventive ReLU layer utilizes the exemplary inventive U-net CNN, which has been trained to apply a non-saturating activation function $f(x)=\max(0,x)$. It increases the nonlinear properties of the decision function and of the overall network without affecting the receptive fields of the exemplary inventive convolution and activation layer.

In some embodiments, the exemplary inventive pooling layer utilizes the exemplary inventive U-net CNN, which has been trained to provide a form of non-linear downsampling by combining the outputs of neuron clusters at one layer into a single neuron in the next layer. In some embodiments, the exemplary inventive U-net CNN may be trained to implement an exemplary inventive max pooling that partitions the input image into a set of non-overlapping rectangles and, for each such sub-region, outputs the maximum value from each of a cluster of neurons at the prior layer. The exemplary inventive pooling layer serves to progressively reduce the spatial size of the representation, to reduce the number of parameters and amount of computation in the network, and hence to also control overfitting.

After the exemplary inventive contraction path, the exemplary inventive U-net CNN proceeds with an exemplary inventive expansive path and provides a fully connected layer at substep 604f according to some embodiment. During the expansion, the exemplary inventive U-net CNN has been trained to combine the feature and spatial information through a sequence of up-convolutions and concatenations with high-resolution features from the contracting path.

In some embodiments, the fully connected layers consist of neurons in an exemplary inventive fully connected layer have connections to all activations in the previous layers. According to some embodiment, the neurons of the exemplary inventive fully connected layers correspond to a pizza ingredients map based on classification of each pixel of the image performed by the exemplary inventive U-net CNN. The pizza ingredients map includes but not limited to crust, cheese, and toppings such as pepperoni and ham.

Table 1 shows an exemplary inventive data schema for an illustrative segmentation model implemented at step 604 as described herein.

TABLE 1

| Layer (type) | Output Shape | Param # | Connected to |
|---|---|---|---|
| input_1 (InputLayer) | (None, 512, 512, 3) | 0 | |
| conv2d_1 (Conv2D) | (None, 512, 512, 64) | 1792 | input_1[0][0] |
| conv2d_2 (Conv2D) | (None, 512, 512, 64) | 36928 | conv2d_1[0][0] |
| max_pooling2d_1 (MaxPooling2D) | (None, 256, 256, 64) | 0 | conv2d_2[0][0] |
| conv2d_3 (Conv2D) | (None, 256, 256, 128) | 73856 | max_pooling2d_1[0][0] |
| conv2d_4 (Conv2D) | (None, 256, 256, 128) | 147584 | conv2d_3[0][0] |
| max_pooling2d_2 (MaxPooling2D) | (None, 128, 128, 128) | 0 | conv2d_4[0][0] |
| conv2d_5 (Conv2D) | (None, 128, 128, 256) | 295168 | max_pooling2d_2[0][0] |
| conv2d_6 (Conv2D) | (None, 128, 128, 256) | 590080 | conv2d_5[0][0] |
| max_pooling2d_3 (MaxPooling2D) | (None, 64, 64, 256) | 0 | conv2d_6[0][0] |
| conv2d_7 (Conv2D) | (None, 64, 64, 512) | 1180160 | max_pooling2d_3[0][0] |
| conv2d_8 (Conv2D) | (None, 64, 64, 512) | 2359808 | conv2d_7[0][0] |
| dropout_1 (Dropout) | (None, 64, 64, 512) | 0 | conv2d_8[0][0] |
| max_pooling2d_4 (MaxPooling2D) | (None, 32, 32, 512) | 0 | dropout_1[0][0] |
| conv2d_9 (Conv2D) | (None, 32, 32, 1024) | 4719616 | max_pooling2d_4[0][0] |
| conv2d_10 (Conv2D) | (None, 32, 32, 1024) | 9438208 | conv2d_9[0][0] |
| dropout_2 (Dropout) | (None, 32, 32, 1024) | 0 | conv2d_10[0][0] |
| up_sampling2d_1 (UpSampling2D) | (None, 64, 64, 1024) | 0 | dropout_2[0][0] |
| conv2d_11 (Conv2D) | (None, 64, 64, 512) | 2097664 | up_sampling2d_1[0][0] |
| merge_1 (Merge) | (None, 64, 64, 1024) | 0 | dropout_1[0][0] conv2d_11[0][0] |
| conv2d_12 (Conv2D) | (None, 64, 64, 512) | 4719104 | merge_1[0][0] |
| conv2d_13 (Conv2D) | (None, 64, 64, 512) | 2359808 | conv2d_12[0][0] |
| up_sampling2d_2 (UpSampling2D) | (None, 128, 128, 512) | 0 | conv2d_13[0][0] |
| conv2d_14 (Conv2D) | (None, 128, 128, 256) | 524544 | up_sampling2d_2[0][0] |
| merge_2 (Merge) | (None, 128, 128, 512) | 0 | conv2d_6[0][0] conv2d_14[0][0] |
| conv2d_15 (Conv2D) | (None, 128, 128, 256) | 1179904 | merge_2[0][0] |
| conv2d_16 (Conv2D) | (None, 128, 128, 256) | 590080 | conv2d_15[0][0] |
| up_sampling2d_3 (UpSampling2D) | (None, 256, 256, 256) | 0 | conv2d_16[0][0] |
| conv2d_17 (Conv2D) | (None, 256, 256, 128) | 131200 | up_sampling2d_3[0][0] |
| merge_3 (Merge) | (None, 256, 256, 256) | 0 | conv2d_4[0][0] conv2d_17[0][0] |
| conv2d_18 (Conv2D) | (None, 256, 256, 128) | 295040 | merge_3[0][0] |
| conv2d_19 (Conv2D) | (None, 256, 256, 128) | 147584 | conv2d_18[0][0] |
| up_sampling2d_4 (UpSampling2D) | (None, 512, 512, 128) | 0 | conv2d_19[0][0] |
| conv2d_20 (Conv2D) | (None, 512, 512, 64) | 32832 | up_sampling2d_4[0][0] |
| merge_4 (Merge) | (None, 512, 512, 128) | 0 | conv2d_2[0][0] conv2d_20[0][0] |
| conv2d_21 (Conv2D) | (None, 512, 512, 64) | 73792 | merge_4[0][0] |
| conv2d_22 (Conv2D) | (None, 512, 512, 32) | 18464 | conv2d_21[0][0] |
| conv2d_23 (Conv2D) | (None, 512, 512, 16) | 4624 | conv2d_22[0][0] |
| conv2d_24 (Conv2D) | (None, 512, 512, 3) | 51 | conv2d_23[0][0] |

Total params: 31,017,891
Trainable params: 31,017,891
Non-trainable params: 0

Using the ingredients map from step 604, at step 606, the exemplary inventive U-net CNN has been trained to apply exemplary scoring rules, as detailed herein, for grading the pizza, which produces a column of scores for one slice of the 8 slices of the pizza. The output results of the grading from the exemplary inventive U-net CNN for one piece of pizza are further illustrated and magnified in FIG. 6C.

After all slices are graded, the exemplary inventive U-net CNN outputs a matrix with 8 columns with each column corresponds to each of the 8 slices at step 608 (as magnified in FIG. 6D). Then the inventive U-net CNN post-processes the matrix using statistical models to improve the quality of the score at step 610 (as magnified in FIG. 6E). At step 612 (as magnified in FIG. 6F), the exemplary inventive U-net CNN outputs an improved score matrix in a binary form consisting of only 0's and 1's. Based on the improved score matrix, the final score is determined at step 614.

Figure 7:
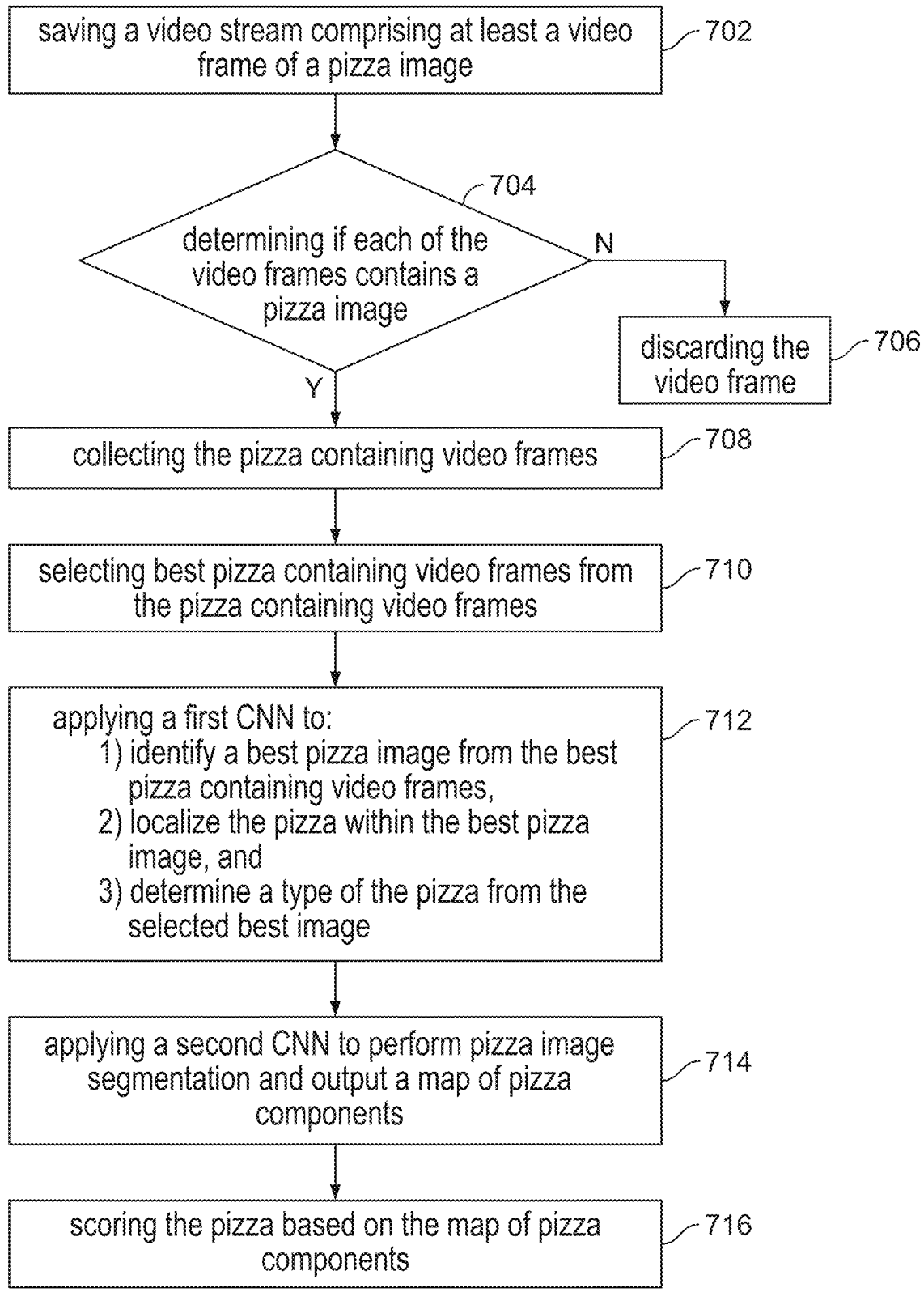

FIG. 7 is a snapshot of a diagram of a workflow 700 for identifying and evaluating the food production such as pizza production applying the exemplary inventive CNN described herein according to some embodiments. The method begins with step 702 in which a video stream containing at least a video frame of a pizza image is saved using the Smart Video Saver 1 as discussed in relation with FIG. 1. At step 704, it is determined if each of the video frames of the video stream contains a pizza image. If there is no pizza image in the video frame, at step 706, the video frame is discarded. If there is a pizza image in the video frame, at step 708, the pizza containing video frames are collected and used for searching the best images. At step 710, a set of best pizza containing video frames are selected from all the pizza containing video frames. In some embodiment, selecting the set of best pizza containing video frames is performed by the exemplary inventive coarse and fast detector of the exemplary inventive Pizza Detector 2 as discussed in relation with FIG. 1. In some embodiment, selecting the set of best pizza containing video frames includes but not limited to determining if the video frames have motion or defocus blur. At step 712, the set of selected best pizza containing video frames are processed based on a first trained exemplary inventive CNN for identifying a best pizza image from the best pizza containing video frames, localizing the pizza within the best pizza image, and determine a type of the pizza from the selected best image. In some embodiment, identifying the best pizza image is performed by the exemplary inventive accurate and slow detector of the exemplary inventive Pizza Detector 2 as discussed in relation with FIG. 1. In some embodiment, localization of the pizza includes defining a bounding box and one or more binary masks on the image.

When the type of the pizza is determined, the process then performs automatic pizza image segmentation applying a second trained exemplary inventive CNN at step 714. In some embodiments, such segmentation is performed by the exemplary inventive Scorer 4 as discussed in relation with FIG. 1. In some embodiments, the segmentation determines a map of components of the pizza such as dough, chesses, and toppings. Then at step 716, the pizza is automatically scored based on the map of components. In some embodiments, the scoring is performed by the exemplary inventive Scorer 4 as discussed in relation with FIG. 1.

Figure 8:
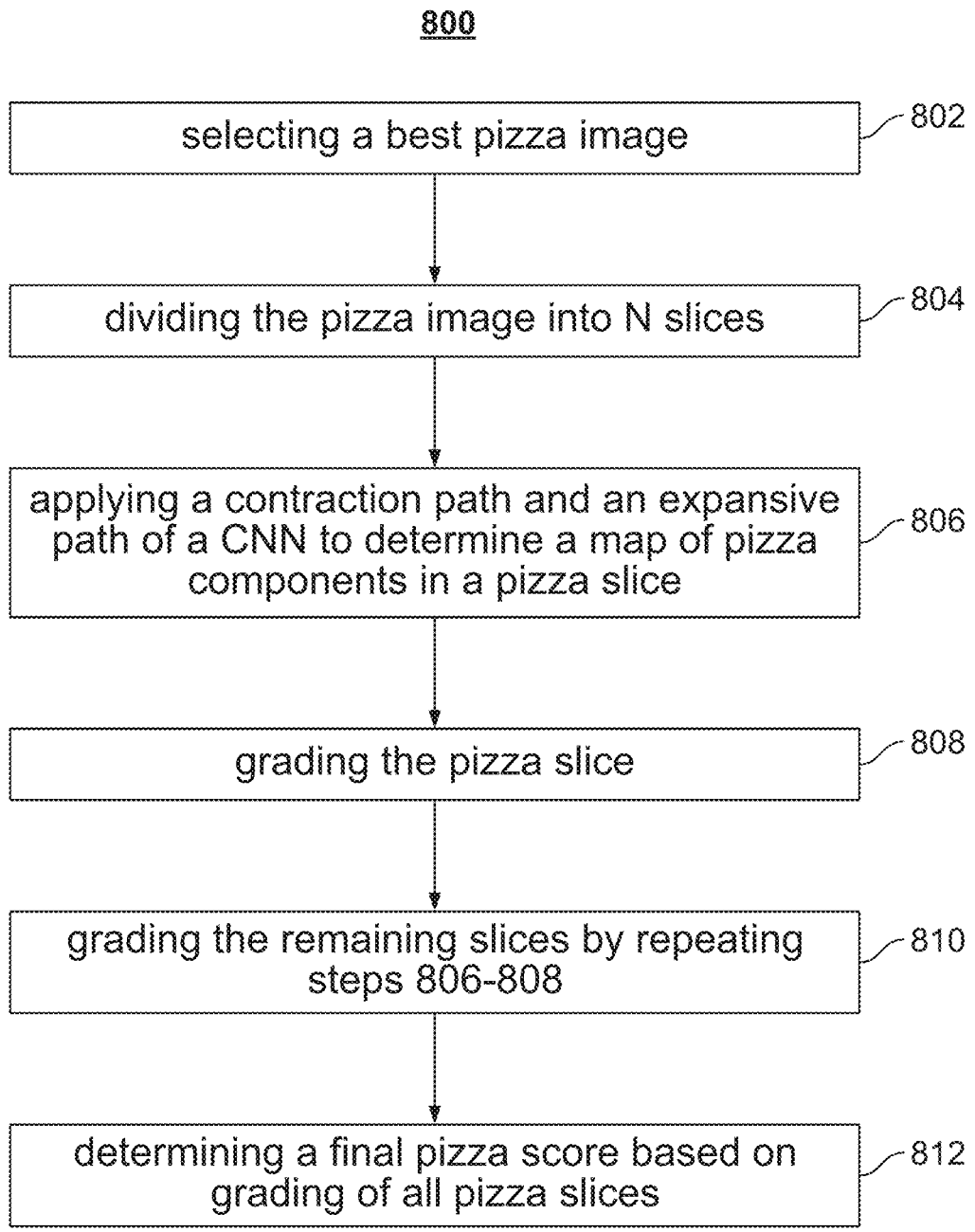

FIG. 8 is a snapshot of a diagram of a workflow 800 for automatically scoring the pizza implementing the second trained exemplary inventive CNN described herein according to some embodiments. At step 802, a selected best pizza image is provided as an input for the scoring process. Then at step 804, the method proceeds to divide the pizza image into N slices in which N is a non-zero integer. In some embodiment, N=8. At step 806, one of the N slices are processed to determine the map of pizza components by applying an exemplary inventive contraction path and an exemplary inventive expansive path of the second trained exemplary inventive CNN according to some embodiments.

In some embodiment, the exemplary inventive contraction path consists of repeated applications of convolution and activation layers. In some embodiments, after the first convolution and activation layer, a subsampling and batch normalization layer may be applied. In some embodiments, each convolution and activation layer is followed by a rectified linear unit (ReLU) layer and a pooling layer before proceeding with the next convolution and activation layer.

In some embodiment, during the exemplary inventive expansive path, the process combines the feature and spatial information through a sequence of up-convolutions and concatenations with high-resolution features from the exemplary inventive contracting path.

Using the map of pizza components from step 806, at step 808, the exemplary inventive process may apply one or more pizza-scoring rules detailed herein to grade the slice. Then steps 806-808 are repeated at step 810 to grade the remaining slices of the pizza. Finally, at Step 812, a final score is determined based on the grades of all slices of the pizza.

Figure 9:
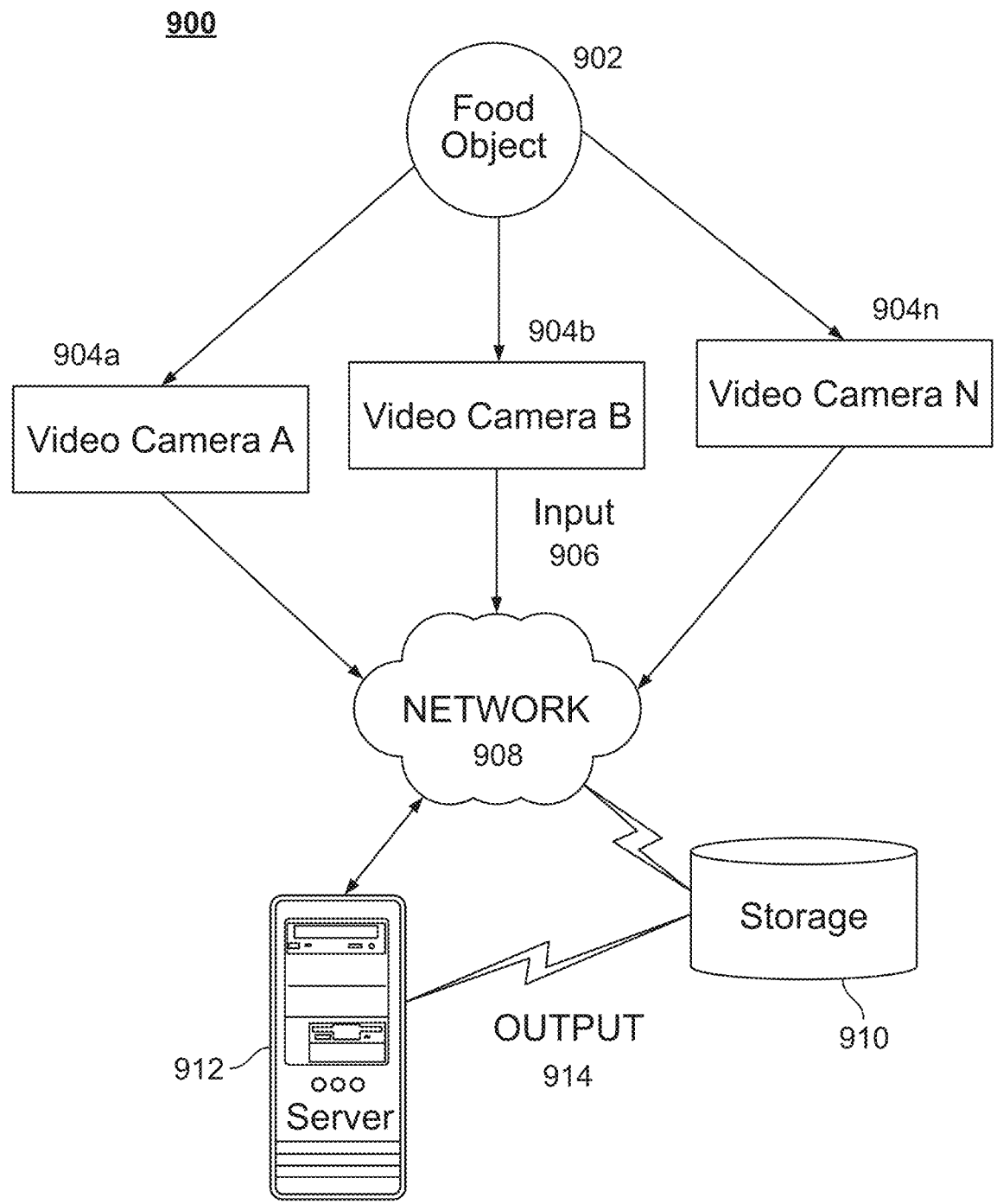

FIG. 9 illustrates the exemplary inventive CNN-based and computer-implemented system 900 that has been trained to perform searching and scoring a Food Object 902, e.g., pizzas, produced by a restaurant. Videos 1, 2, 3, . . . N of the video stream are captured by one or more Video Cameras: Video Camera A 904a, Video Camera B 904b . . . Video Camera N 904n (e.g., IP camera 202 of FIG. 2A) as discussed herein according to some embodiments. The video stream is provided as Input 906 and transmitted via a Network 908 for the further searching and scoring processes. In some embodiments, Videos 1, 2, 3, . . . N of the video stream are stored in a Storage 910 to be retrieved later. The Storage 910 may be but not limited to a local storage or a remote storage medium and/or database. In some embodiments, Input 906 is transmitted via the Network 1008 to a Server 912 for processing. The Server 912 selects a best image of the pizza among frames of the video stream and locates the pizza portion on the best image. The best image is further processed by the Server 912 for scoring and the scoring result is transmitted as Output 914. In some embodiment, the Output 914 may be stored on the Storage 910 for later retrieval for monitoring and/or improving food producing processes.

In some embodiments, the present invention provides for an exemplary computer system and methods for searching and scoring pizza assisted with video cameras and implemented with improved convolutional neural network (CNN)-based algorithms, which provides advantages of scoring pizzas accurately, thereby resulting an improved accuracy, efficiency, and quality of the pizza production processes.

In some embodiments, the present invention provides for an exemplary inventive convolutional neural network-based and computer-implemented method for identifying and evaluating food production such as pizza production, including: receiving, by a processor, a continuous video stream from at least one camera position over a table configured to receive prepared pizzas; collecting, by the processor, a plurality of pizza containing video frames of a particular pizza from the video stream; applying, by the processor, a first CNN to select a set of best pizza containing video frames of the particular pizza from the plurality of pizza containing video frames; applying, by the processor, the first CNN to identify a best pizza containing image of the particular pizza from the set of best pizza containing video frames; applying, by the processor, the first CNN to localize at least one pizza portion of the particular pizza in the identified best pizza containing image; applying, by the processor, the first CNN to determine a type of the pizza of the particular pizza from the identified best pizza containing image; applying, by the processor, a second CNN to determine a map of pizza components of the particular pizza by automatically performing pizza image segmentation of the pizza portion based on at least the type of the pizza; and applying, by the processor, the second CNN to automatically score the particular pizza based on the determined map of pizza components.

In some embodiments, applying, by the processor, the second CNN to automatically score the particular pizza based on the determined map of pizza components including: dividing, by the processor, the pizza portion of the identified best image into a plurality of slices; grading, by the processor, one of the plurality of slices of the particular pizza; repeating, by the processor, the grading step to grade the remaining slices of the plurality of slices; and determining, by the processor, a final score of the particular pizza based on the grading of the plurality of slices.

In some embodiments, the video frames of the video stream are categorized into cases including:
i) a first case for images that have no pizza present;
ii) a second case for images in which a pizza is present and off-centered;
iii) a third case for images in which the pizza is present and centered, and a pizza image has a resolution quality of X;
iv) a fourth case for images in which the pizza is present and centered, and the pizza image has the resolution quality of Y, where Y is better than X;
v) a fifth case for images in which the pizza is present, centered, and a first type, and the pizza image has a desired resolution quality; and
v) a sixth case for images in which the pizza is present, centered, and a second type, and the pizza image has a desired resolution quality.

In some embodiments, applying the first CNN to select the set of best pizza containing video frames from the pizza containing video frames and to identify the best image are performed by a graphics processing unit (GPU) processor.

In some embodiments, applying the first CNN to select the set of best pizza containing video frames from the pizza containing video frames is performed by a coarse and fast detector.

In some embodiments, selecting the set of best pizza containing video frames from the pizza containing video frames including discounting each pizza containing video frame that has at least one of a motion blur or defocus blur.

In some embodiments, applying the first CNN to identify the best image is performed by an accurate and slow detector.

In some embodiments, the number of the plurality of slices is 8.

In some embodiments, the second CNN has a contraction path and an expansion path.

In some embodiments, the contraction path includes a plurality of convolution and activation layers.

In some embodiments, the contraction path further includes a subsampling and batch normalization layer after a first convolution and activation layer.

In some embodiments, the contraction path further includes a rectified linear unit (ReLU) layer and a pooling layer following each convolution and activation layer before proceeding to a subsequent convolution and activation layer.

In some embodiments, the expansive path includes a sequence of up-convolutions and concatenations configured to combine feature spatial information with high-resolution features from the contracting path.

In some embodiments, the applying the first CNN to localize the at least one pizza portion of the particular pizza in the identified best pizza containing image, including: defining a bounding box; and utilizing one or more pre-determined binary masks.

In some embodiments, the present invention provides for an exemplary inventive convolutional neural network-based and computer-implemented system for identifying and evaluating food production such as pizza production, including: at least one image capturing device; a non-transitory storage memory; one or more processors; and computer program code stored on the non-transitory storage memory and, when executed by the one or more processors, causes the one or more processors to: receiving a continuous video stream from at least one camera position over a table configured to receive prepared pizzas; collecting a plurality of pizza containing video frames of a particular pizza from the video stream; applying a first CNN to select a set of best pizza containing video frames of the particular pizza from the plurality of pizza containing video frames; applying the first CNN to identify a best pizza containing image of the particular pizza from the set of best pizza containing video frames; applying the first CNN to localize at least one pizza portion of the particular pizza in the identified best pizza containing image; applying the first CNN to determine a type of the pizza of the particular pizza from the identified best pizza containing image; applying a second CNN to determine a map of pizza components of the particular pizza by automatically performing pizza image segmentation of the pizza portion based on at least the type of the pizza; and applying the second CNN to automatically score the particular pizza based on the determined map of pizza components.

In some embodiments, the computer program code including instructions for: applying the second CNN to automatically score the particular pizza based on the determined map of pizza components including: dividing the pizza portion of the identified best image into a plurality of slices; grading one of the plurality of slices of the particular pizza; repeating the grading step to grade the remaining slices of the plurality of slices; and determining a final score of the particular pizza based on the grading of the plurality of slices.

In some embodiments, the computer program code includes instructions for applying the first CNN on a GPU processor to select the set of best pizza containing video frames from the pizza containing video frames and to identify the best image.

In some embodiments, the computer program code includes instructions for applying the first CNN to select the set of best pizza containing video frames from the pizza containing video frames is performed by a coarse and fast detector.

In some embodiments, the computer program code includes instructions for applying the first CNN to identify the best image is performed by an accurate and slow detector.

In some embodiments, the present invention provides for an exemplary inventive convolutional neural network-based and computer-implemented non-transitory computer-readable storage medium for identifying and evaluating food production such as pizza production, including processor-executable instructions for: receiving a continuous video stream from at least one camera position over a table configured to receive prepared pizzas; collecting a plurality of pizza containing video frames of a particular pizza from the video stream; selecting a set of best pizza containing video frames of the particular pizza from the plurality of pizza containing video frames; applying a first CNN to identify a best pizza containing image of the particular pizza from the set of best pizza containing video frames; applying the first CNN to localize at least one pizza portion of the particular pizza in the identified best pizza containing image; applying the first CNN to determine a type of the pizza of the particular pizza from the identified best pizza containing image; applying a second CNN to determine a map of pizza components of the particular pizza by automatically performing pizza image segmentation of the pizza portion based on at least the type of the pizza; and applying the second CNN to automatically score the particular pizza based on the determined map of pizza components.

In some embodiments, non-transitory computer-readable storage medium including processor-executable instructions for applying the second CNN to automatically score the particular pizza based on the determined map of pizza components, including: dividing the pizza portion of the identified best image into a plurality of slices; grading one of the plurality of slices of the particular pizza; repeating the grading step to grade the remaining slices of the plurality of slices; and determining a final score of the particular pizza based on the grading of the plurality of slices.

Publications cited throughout this document are hereby incorporated by reference in their entirety. Although the various aspects of the invention have been illustrated above by reference to examples and embodiments, it will be appreciated that the scope of the invention is defined not by the foregoing description but by the following claims properly construed under principles of patent law. Further, many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any undesired steps in a particular embodiment may be eliminated).

What is claimed is:

1. A method, comprising:
receiving, by a processor, a continuous video stream from at least one camera position over a table configured to receive a plurality of prepared pizzas;
collecting, by the processor, a plurality of pizza containing video frames of a particular pizza from the video stream;
applying, by the processor, a first conventional neural network ("CNN") of a plurality of CNNs to select a set of best pizza containing video frames of the particular pizza from the plurality of pizza containing video frames;
applying, by the processor, a second CNN of the plurality of CNNs to identify a best pizza containing image of the particular pizza from the set of best pizza containing video frames,
wherein the second CNN devalues at least one set of a plurality of sets of pizza containing video frames of the particular pizza based on at least one image defects within the identified best pizza containing image of the particular pizza;
applying, by the processor, the first CNN of the plurality of CNNs to localize at least one pizza portion of the particular pizza in the identified best pizza containing image;
applying, by the processor, the second CNN of the plurality of CNNs to determine a type of the pizza of the particular pizza from the identified best pizza containing image;
applying, by the processor, a third CNN of the plurality of CNNs to determine a map of pizza components of the particular pizza by automatically performing pizza image segmentation of the pizza portion based on at least the type of the pizza; and
applying, by the processor, the third CNN of the plurality of CNNs to automatically score the particular pizza based on the determined map of pizza components, comprising:
dynamically dividing, by the processor, the pizza portion of the identified best image into a plurality of slices;
dynamically grading, by the processor, one of the plurality of slices of the particular pizza;
automatically repeating, by the processor, the grading step to grade the remaining slices of the plurality of slices;
automatically determining, by the processor, a final score of the particular pizza based on the grading of the plurality of slices; and
automatically instructing, by the processor, based on the final score of the particular pizza, one of dispensing of the particular pizza to a customer or discarding the particular pizza.

2. The method of claim 1, wherein the video frames of the video stream are categorized into cases comprising:
i) a first case for images that have no pizza present;
ii) a second case for images in which a pizza is present and off-centered;
iii) a third case for images in which the pizza is present and centered, and a pizza image has a resolution quality of X;
iv) a fourth case for images in which the pizza is present and centered, and the pizza image has the resolution quality of Y, where Y is better than X;
v) a fifth case for images in which the pizza is present, centered, and a first type, and the pizza image has a desired resolution quality; and
v) a sixth case for images in which the pizza is present, centered, and a second type, and the pizza image has a desired resolution quality.

3. The method of claim 1, wherein selecting the set of best pizza containing video frames from the pizza containing video frames further comprises discounting each pizza containing video frame that has at least one of a motion blur or defocus blur.

4. The method of claim 1, wherein the number of the plurality of slices is 8.

5. The method of claim 1, wherein the second CNN of the plurality of CNNs has a contraction path and an expansion path.

6. The method of claim 5, wherein the contraction path comprises a plurality of convolution and activation layers.

7. The method of claim 6, wherein the contraction path further comprises a subsampling and batch normalization layer after a first convolution and activation layer.

8. The method of claim 6, wherein the contraction path further comprises a rectified linear unit (ReLU) layer and a pooling layer following each convolution and activation layer before proceeding to a subsequent convolution and activation layer.

9. The method of claim 5, wherein the expansive path comprises a sequence of up-convolutions and concatenations configured to combine feature spatial information with a predetermined resolution features from the contracting path.

10. The method of claim 1, wherein the applying the first CNN of the plurality of CNNs to localize the at least one pizza portion of the particular pizza in the identified best pizza containing image further comprises:
defining a bounding box; and
utilizing one or more pre-determined binary masks.

11. A system, comprising:
at least one image capturing device; a non-transitory storage memory; one or more processors; and
computer program code stored on the non-transitory storage memory and, when executed by the one or more processors, causes the one or more processors to:
receiving a continuous video stream from at least one camera position over a table configured to receive a plurality of prepared pizzas;
collecting a plurality of pizza containing video frames of a particular pizza from the video stream;
applying a first conventional neural network ("CNN") of a plurality of CNNs to select a set of best pizza containing video frames of the particular pizza from the plurality of pizza containing video frames;
applying a second CNN of the plurality of CNNs to identify a best pizza containing image of the particular pizza from the set of best pizza containing video frames,
wherein the second CNN devalues at least one set of a plurality of sets of pizza containing video frames of the particular pizza based on at least one image defects within the identified best pizza containing image of the particular pizza;
applying the first CNN of the plurality of CNNs to localize at least one pizza portion of the particular pizza in the identified best pizza containing image;

applying the second CNN of the plurality of CNNs to determine a type of the pizza of the particular pizza from the identified best pizza containing image;

applying a third CNN of the plurality of CNNs to determine a map of pizza components of the particular pizza by automatically performing pizza image segmentation of the pizza portion based on at least the type of the pizza; and applying the third CNN of the plurality of CNNs to automatically score the particular pizza based on the determined map of pizza components, comprising:

dynamically dividing the pizza portion of the identified best image into a plurality of slices;

dynamically grading one of the plurality of slices of the particular pizza;

automatically repeating the grading step to grade the remaining slices of the plurality of slices;

automatically determining a final score of the particular pizza based on the grading of the plurality of slices; and automatically instructing based on the final score of the particular pizza, one of dispensing of the particular pizza to a customer or discarding the particular pizza.

12. A non-transitory computer-readable storage medium comprising processor-executable instructions for:

receiving a continuous video stream from at least one camera position over a table configured to receive a plurality of prepared pizzas;

collecting a plurality of pizza containing video frames of a particular pizza from the video stream;

applying a first conventional neural network ("CNN") of a plurality of CNNs to select a set of best pizza containing video frames of the particular pizza from the plurality of pizza containing video frames;

applying a second CNN of the plurality of CNNs to identify a best pizza containing image of the particular pizza from the set of best pizza containing video frames, wherein the second CNN devalues at least one set of a plurality of sets of pizza containing video frames of the particular pizza based on at least one image defects within the identified best pizza containing image of the particular pizza;

applying the first CNN of the plurality of CNNs to localize at least one pizza portion of the particular pizza in the identified best pizza containing image;

applying the second CNN of the plurality of CNNs to determine a type of the pizza of the particular pizza from the identified best pizza containing image;

applying a third CNN of the plurality of CNNs to determine a map of pizza components of the particular pizza by automatically performing pizza image segmentation of the pizza portion based on at least the type of the pizza; and applying the third CNN of the plurality of CNNs to automatically score the particular pizza based on the determined map of pizza components, comprising:

dynamically dividing the pizza portion of the identified best image into a plurality of slices;

dynamically grading one of the plurality of slices of the particular pizza;

automatically repeating the grading step to grade the remaining slices of the plurality of slices;

automatically determining a final score of the particular pizza based on the grading of the plurality of slices; and automatically instructing based on the final score of the particular pizza, one of dispensing of the particular pizza to a customer or discarding the particular pizza.

* * * * *